Feb. 10, 1931. G. BARKSTROM 1,792,061
MACHINE FOR THE MANUFACTURE OF STEEL CHAIN
Filed July 22, 1927 15 Sheets-Sheet 1

Inventor:
Gustave Barkstrom, Deceased
Agnes Barkstrom, Administratrix
BY
ATTORNEY Feb. 10, 1931.  G. BARKSTROM  1,792,061
MACHINE FOR THE MANUFACTURE OF STEEL CHAIN
Filed July 22, 1927   15 Sheets-Sheet 5

Inventor.
Gustave Barkstrom Deceased
Agnes Barkstrom, Administratrix

BY *R.P. Doolittle*
ATTORNEY.

Feb. 10, 1931.  G. BARKSTROM  1,792,061
MACHINE FOR THE MANUFACTURE OF STEEL CHAIN
Filed July 22, 1927  15 Sheets-Sheet 6

Inventor
Gustave Barkstrom, Deceased
Agnes Barkstrom, Administratrix.

BY
ATTORNEY

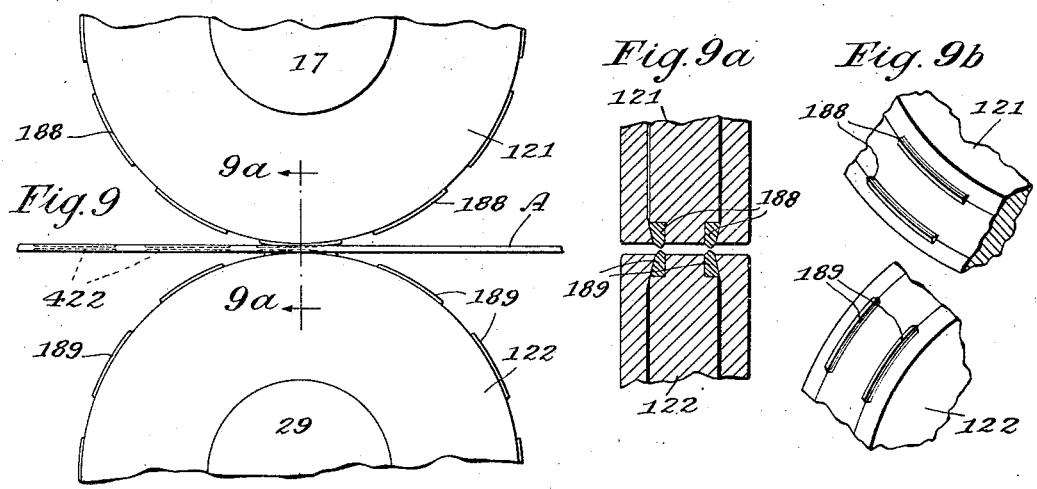
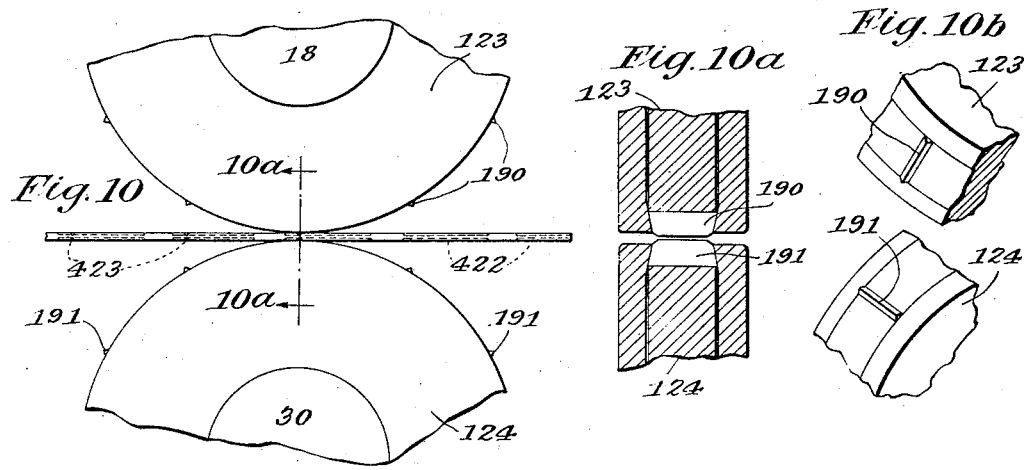
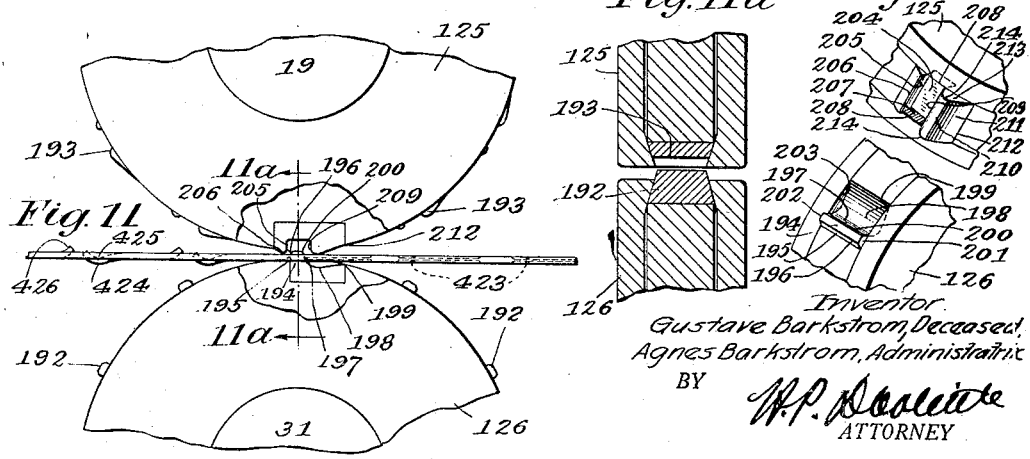

Feb. 10, 1931.  G. BARKSTROM  1,792,061
MACHINE FOR THE MANUFACTURE OF STEEL CHAIN
Filed July 22, 1927    15 Sheets-Sheet 9
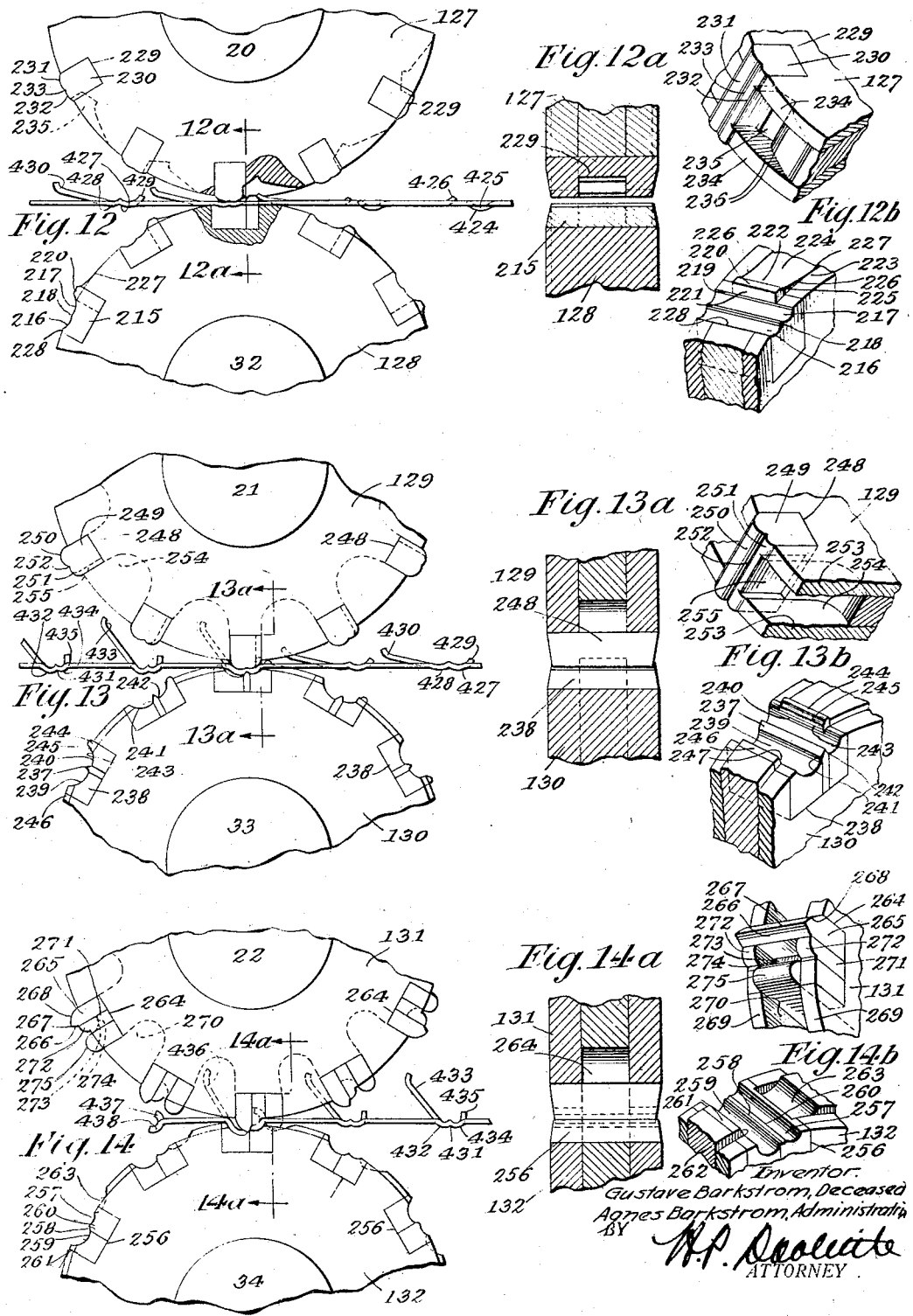

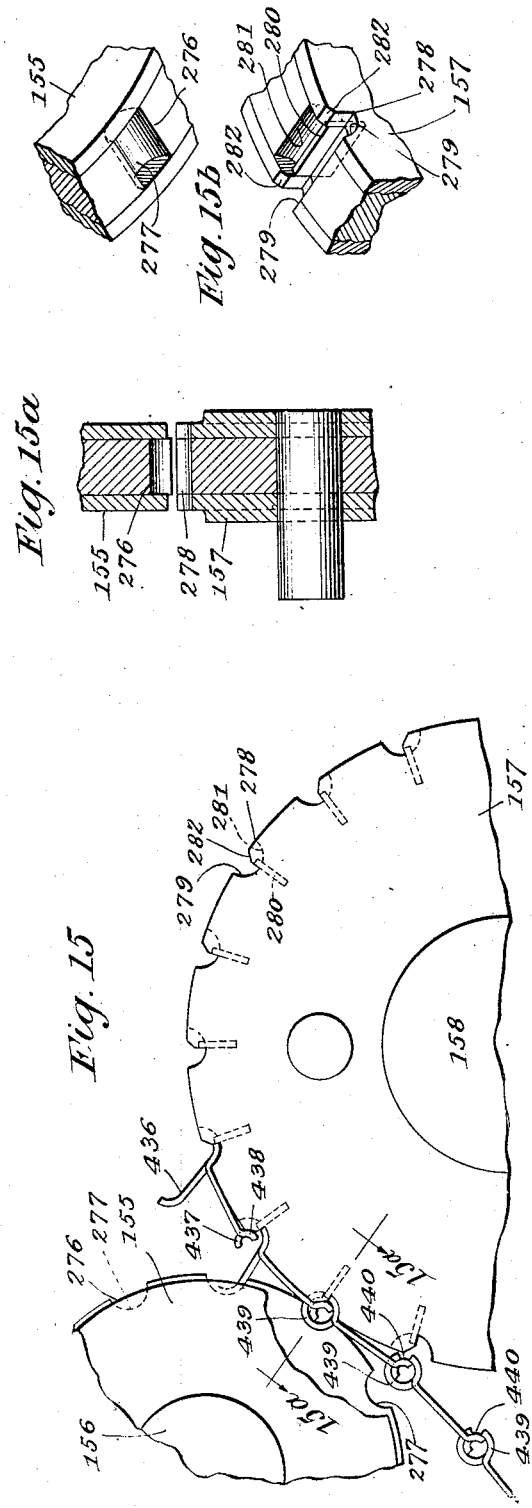
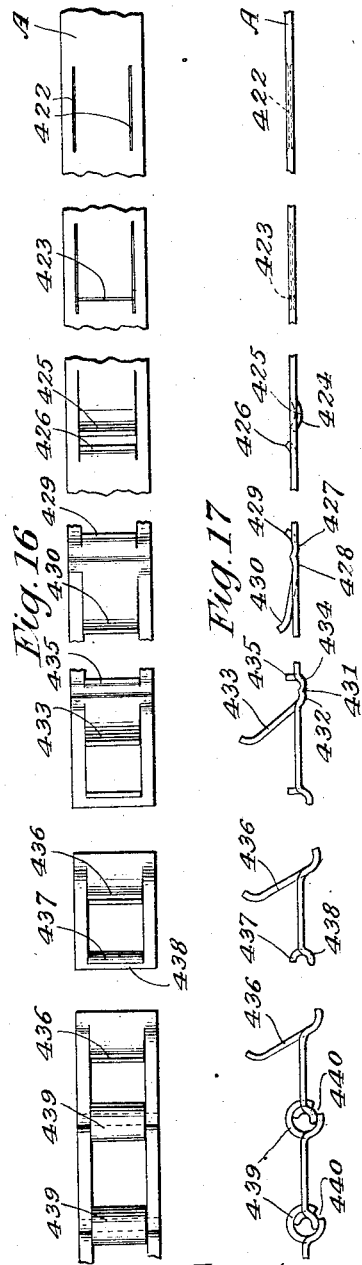

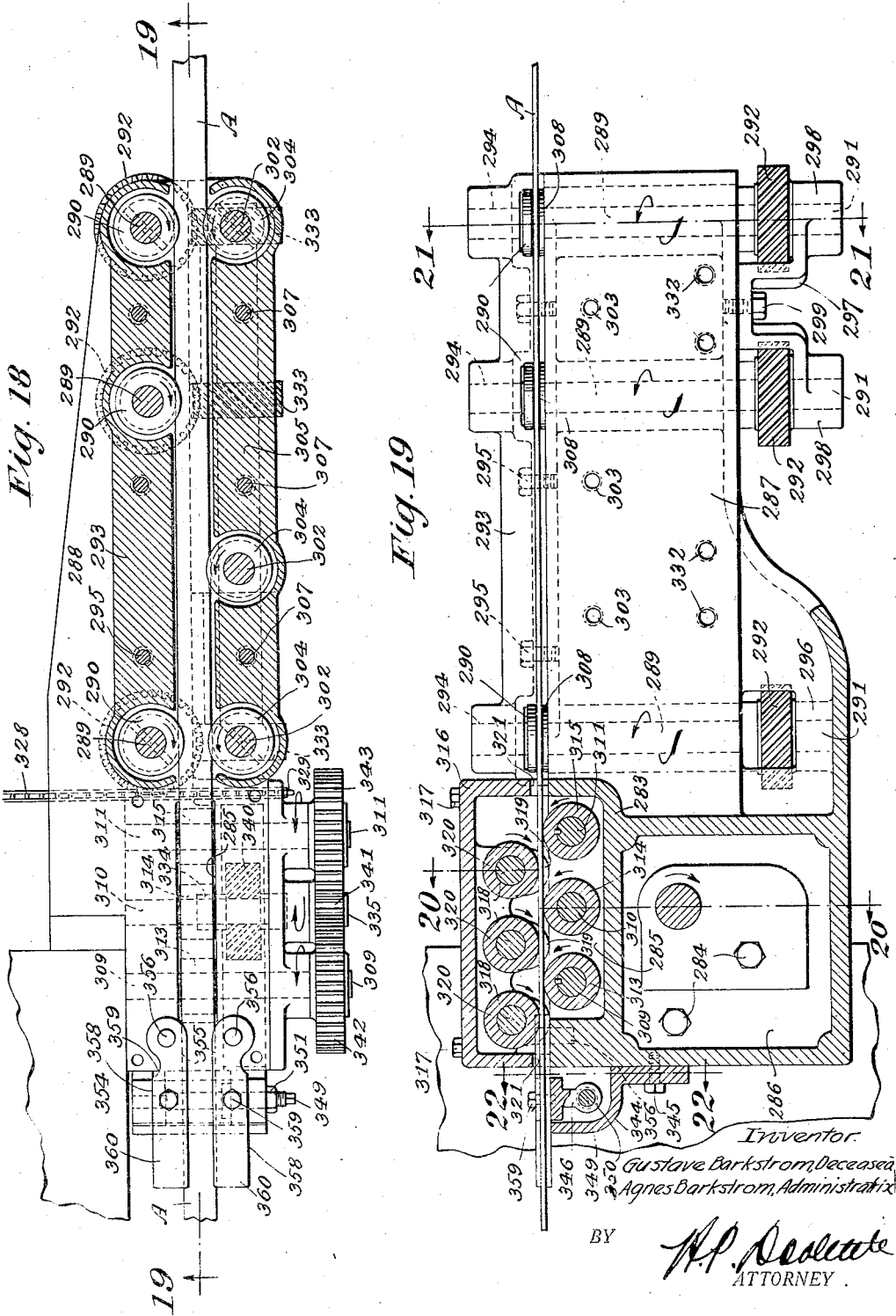

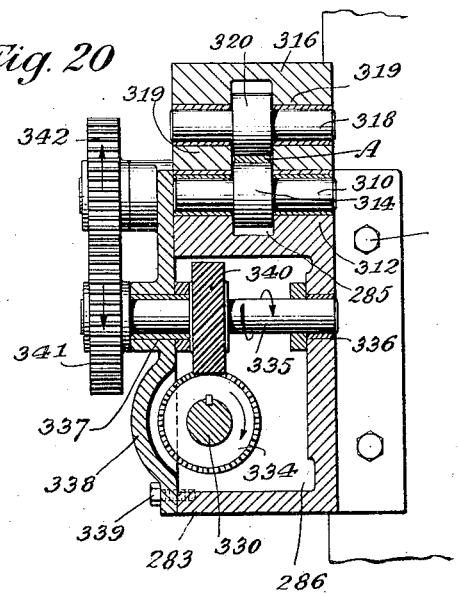
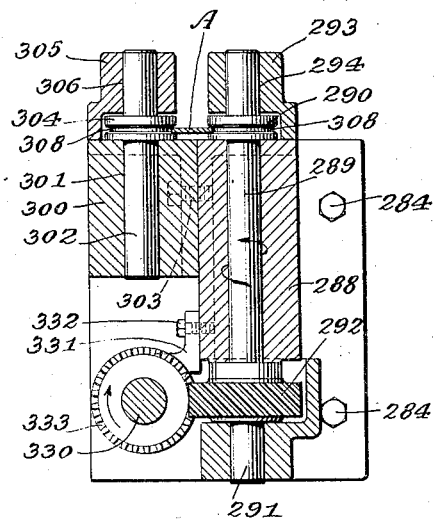
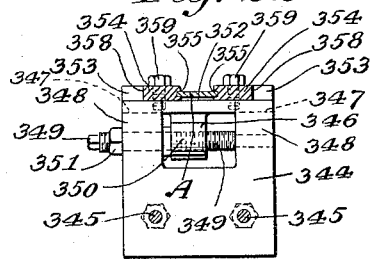

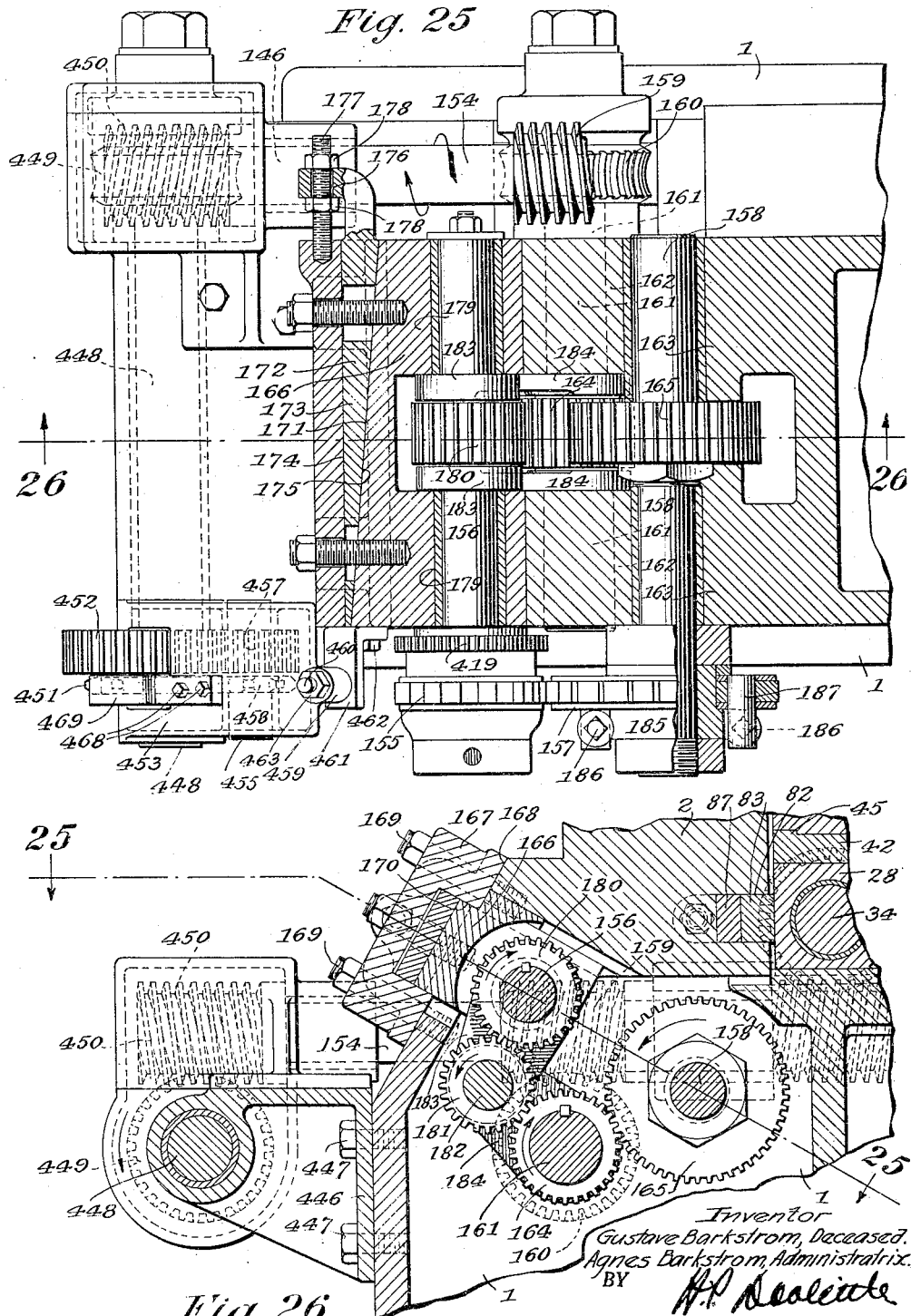

Feb. 10, 1931.   G. BARKSTROM   1,792,061
MACHINE FOR THE MANUFACTURE OF STEEL CHAIN
Filed July 22, 1927   15 Sheets-Sheet 14
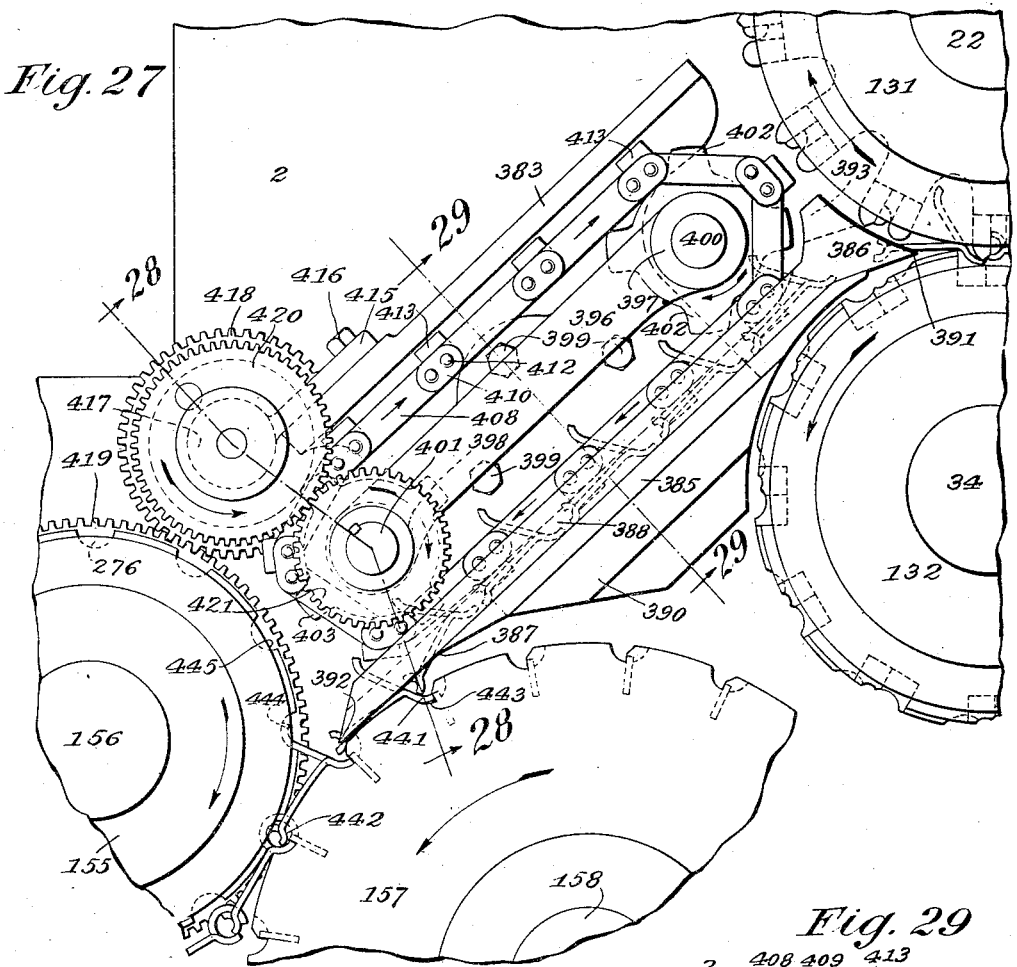
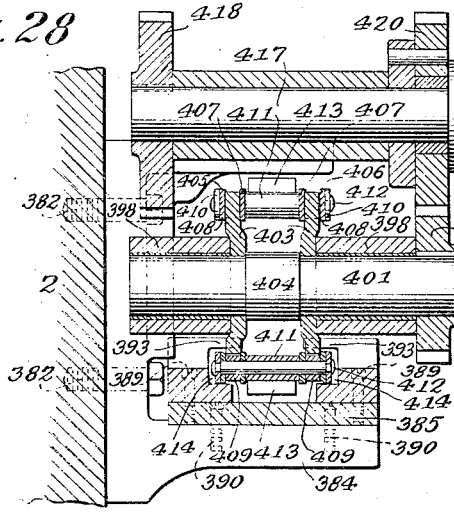
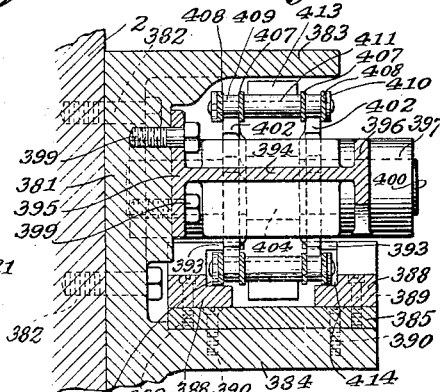
Inventor
Gustave Barkstrom, Deceased
Agnes Barkstrom, Administratrix.
BY
ATTORNEY

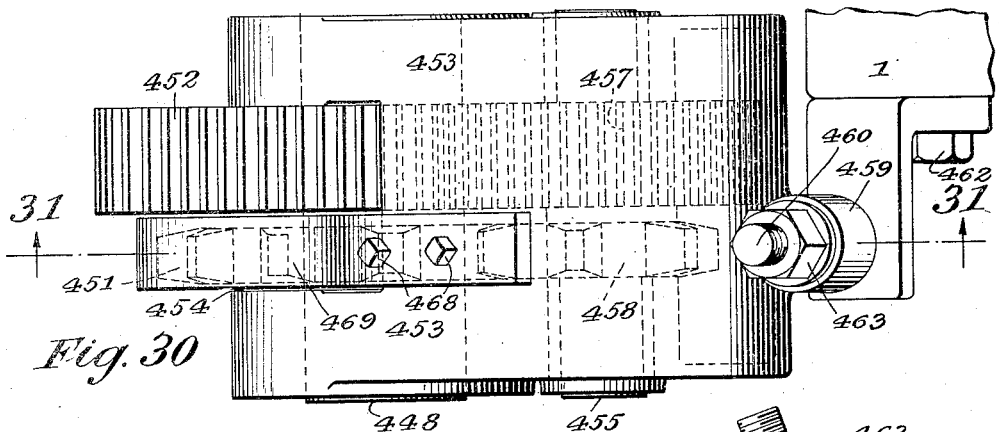
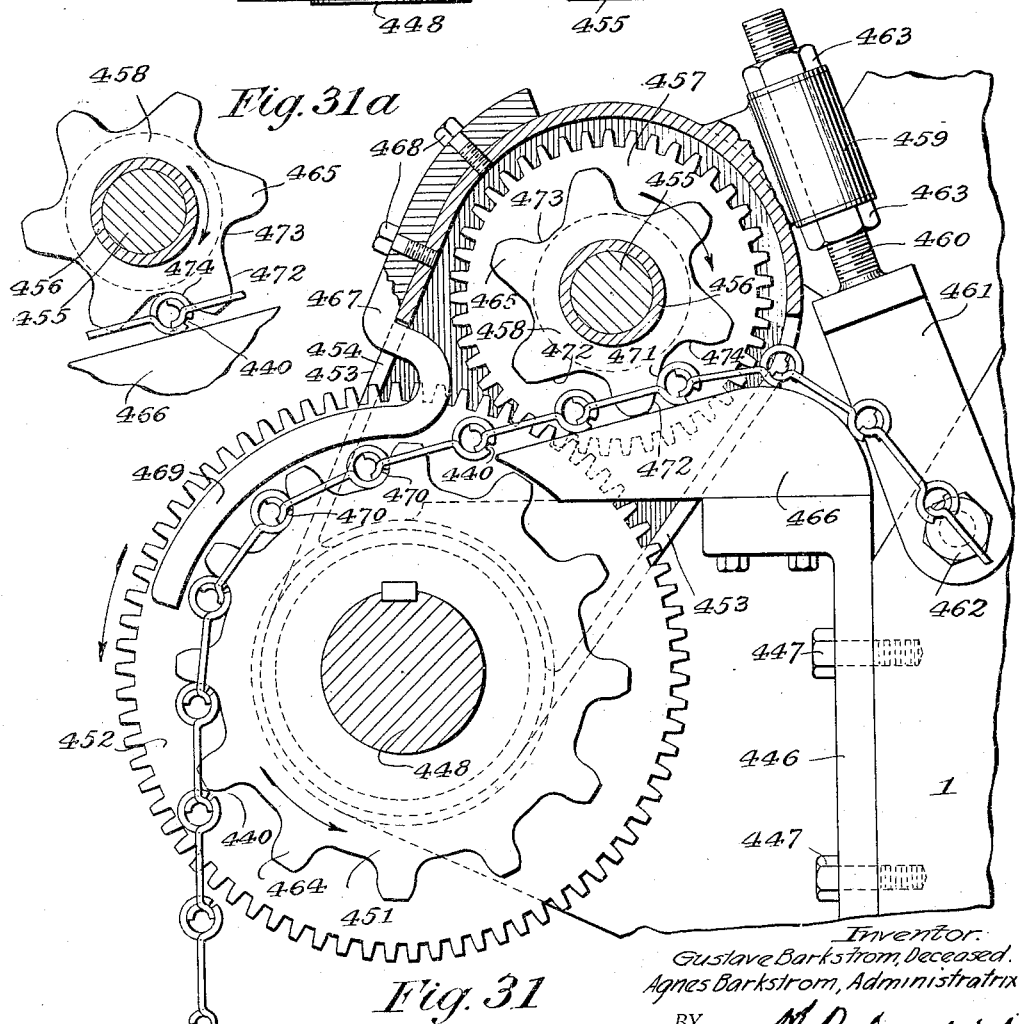

Patented Feb. 10, 1931

1,792,061

UNITED STATES PATENT OFFICE

GUSTAF BARKSTROM, DECEASED, LATE OF HINSDALE, ILLINOIS, BY AGNES BARKSTROM ADMINISTRATRIX, OF HINSDALE, ILLINOIS, ASSIGNOR, BY MESNE ASSIGNMENTS, TO THE LOCKE STEEL CHAIN COMPANY, OF BRIDGEPORT, CONNECTICUT, A CORPORATION OF CONNECTICUT

MACHINE FOR THE MANUFACTURE OF STEEL CHAIN

Application filed July 22, 1927. Serial No. 207,719.

This invention relates to an apparatus for making chain links and assembling the same, and has more especial reference to an apparatus for operating upon a strip of metal while the same is continuously fed to transform the strip into connected chain links.

The invention has for its general object to present a number of improvements over the several features of the apparatus disclosed in the pending application of Sylvanus D. Locke and Charles Parker, Serial No. 26,279, filed April 27, 1925. Prior to the making of the invention illustrated, described and claimed in that application, chain links had been formed and assembled by utilization of various combinations of dies (mostly reciprocatory and stationary dies) designed to move relatively to each other, but chain links had not theretofore been formed and assembled by utilization of dies the working elements of which have forward motion with a strip of metal, in addition to their motions necessary to accomplish transformation of the strip into connected chain links. In the application of Locke and Parker identified, an apparatus is disclosed for successively transforming strip metal into connected chain links by performing operations upon the strip concurrently with the feeding thereof, wherein the working or forming elements of the apparatus have forward motion with the strip, as well as the motions necessary to transform the strip into chain. In said application identified the different working or forming elements are carried by separate pressure producing elements to reduce the load on the pressure producing elements and greatly reduce their size; the preliminary scoring, shearing and forming operations are performed by working elements which move uniformly and gradually toward and into the stock, whereby the work in each operation is done gradually and with little pressure instead of at once and by heavy pressure, as with flat reciprocating dies; the working or forming elements or dies themselves are capable of feeding the metal strip, as well as the finished chain and the severed links between the strip and chain, and no other feed mechanism is required, this reducing waste at the ends of the strip metal coils; mechanism is present for stretching the assembled chain links up to predetermined size; and there is an arrangement for insuring that the strip metal will align with the working or forming elements of the apparatus.

The present invention accomplishes all of the main objects of the invention of the Locke and Parker application, and has for one of its specific objects to provide an apparatus including more than five stations of link forming and assembling operations as therein shown, and also including working or forming elements or dies at each station which are of modified and more practical structure.

A further specific object is to provide an apparatus wherein the working or forming elements or dies can be more nicely adjusted and fixed in their set adjustments to better synchronize the operations in the apparatus than can the elements or dies of said Locke and Parker application.

Further specific objects are to provide in the apparatus a strip metal straightener of novel and improved construction including rearward guide members adapted to cooperate with other guide members to insure that the strip of metal will align with the working and forming elements of the apparatus; to provide in the apparatus rearward guide members and guide members between the stations of link forming operations for insuring that the strip metal will align with the working and forming elements of the apparatus as just stated, all of which guide members are of improved and practical construction; to provide in the apparatus, between the last station of link forming operations and the station of link assembling operations a blank receiving guide to receive the several blanks as they pass beyond the last set of link forming rolls, and link feeding mechanism adapted to positively propel each severed link blank along said blank receiving guide and into the rolls constituting said station of link assembling operations; to provide in the apparatus, in advance of the link assembling rolls, a link stretching and sizer mechanism adapted to size the hook end of each link made and to stretch each link up to a predetermined size; and to provide novel, improved, efficient and practical mechanism for operating or driving forwardly all of the rotatable dies of the apparatus, as well as for operating or driving forwardly the stretching and sizer mechanism and the feeding mechanism for the severed blanks.

Other objects and advantages will become apparent from the drawings and description of construction and operation of a machine embodying the invention herein selected for the purpose of illustration.

Fig. 9 is an enlarged fragmentary elevational view, partially in section, detailing the first set of rolls;

Fig. 9a is a sectional view, on line 9a—9a in Fig. 9;

Fig. 9b is a fragmentary perspective view of the upper and lower rolls in Fig. 9;

Fig. 10 is an enlarged fragmentary elevational view, partially in section, detailing the second set of rolls;

Fig. 10a is a sectional view, on line 10a—10a in Fig. 10;

Fig. 10b is a fragmentary perspective view of the upper and lower rolls in Fig. 10;

Fig. 11 is an enlarged fragmentary elevational view, partially in section, detailing the third set of rolls;

Fig. 11a is a sectional view, on line 11a—11a in Fig. 11;

Fig. 11b is a fragmentary perspective view of the upper and lower rolls in Fig. 11;

Fig. 12 is an enlarged fragmentary elevational view, partially in section, detailing the fourth set of rolls;

Fig. 12a is a sectional view, on line 12a—12a in Fig. 12;

Fig. 12b is a fragmentary perspective view of the upper and lower rolls in Fig. 12;

Fig. 13 is an enlarged fragmentary elevational view, partially in section, detailing the fifth set of rolls;

Fig. 13a is a sectional view, on line 13a—13a in Fig. 13;

Fig. 13b is a fragmentary perspective view of the upper and lower rolls in Fig. 13;

Fig. 14 is an enlarged fragmentary elevational view, partially in section, detailing the sixth set of rolls;

Fig. 14a is a sectional view, on line 14a—14a in Fig. 14;

Fig. 14b is a fragmentary perspective view of the upper and lower rolls in Fig. 14;

Fig. 15 is an enlarged fragmentary elevational view, partially in section, detailing the assembling set of rolls;

Fig. 15a is a sectional view, on line 15a—15a in Fig. 15;

Fig. 15b is a fragmentary perspective view of the upper and lower rolls in Fig. 15;

Fig. 16 is a plan view of a strip of metal in process of formation into chain, some severed links, and some formed and coupled links being shown;

Fig. 17 is an edge view of the metal strip, severed links, and chain shown in Fig. 16;

Fig. 18 is an enlarged sectional view, on line 18—18 in Fig. 1, disclosing the strip metal straightener;

Fig. 19 is a sectional view, as on line 19—19 in Fig. 18;

Fig. 20 is a sectional view, as on line 20—20 in Fig. 19;

Fig. 21 is a sectional view, as on line 21—21 in Fig. 19;

Fig. 22 is a sectional view, as on line 22—22 in Fig. 19, disclosing the strip metal guide in connection with the straightener;

Fig. 23 is an enlarged front elevational view of a second type of strip metal guide, there being guides of the present type between the different link forming sets of rolls;

Fig. 24 is a side elevational view of the guide of Fig. 23, disclosing the manner of its association with the machine frame;

Fig. 25 is an enlarged fragmentary sectional view, on line 25—25 in Fig. 1, or as on line 25—25 in Fig. 26;

Fig. 26 is a sectional view, as on line 26—26 in Fig. 25;

Fig. 27 is an enlarged elevational view detailing the receiving guide and the propelling mechanism for the severed blanks;

Fig. 28 is a sectional view, on line 28—28 in Fig. 27;

Fig. 29 is a sectional view, on line 29—29 in Fig. 27;

Fig. 30 is an enlarged plan view of the stretching and sizer mechanism on the machine;

Fig. 31 is a sectional view, on line 31—31 in Fig. 30; and

Fig. 31a is a detail of the small stretching and sizing sprocket of Fig. 31, disclosing said small sprocket in a later stage of its sizing operation upon the large end or sprocket bar of a link.

Figure 1:
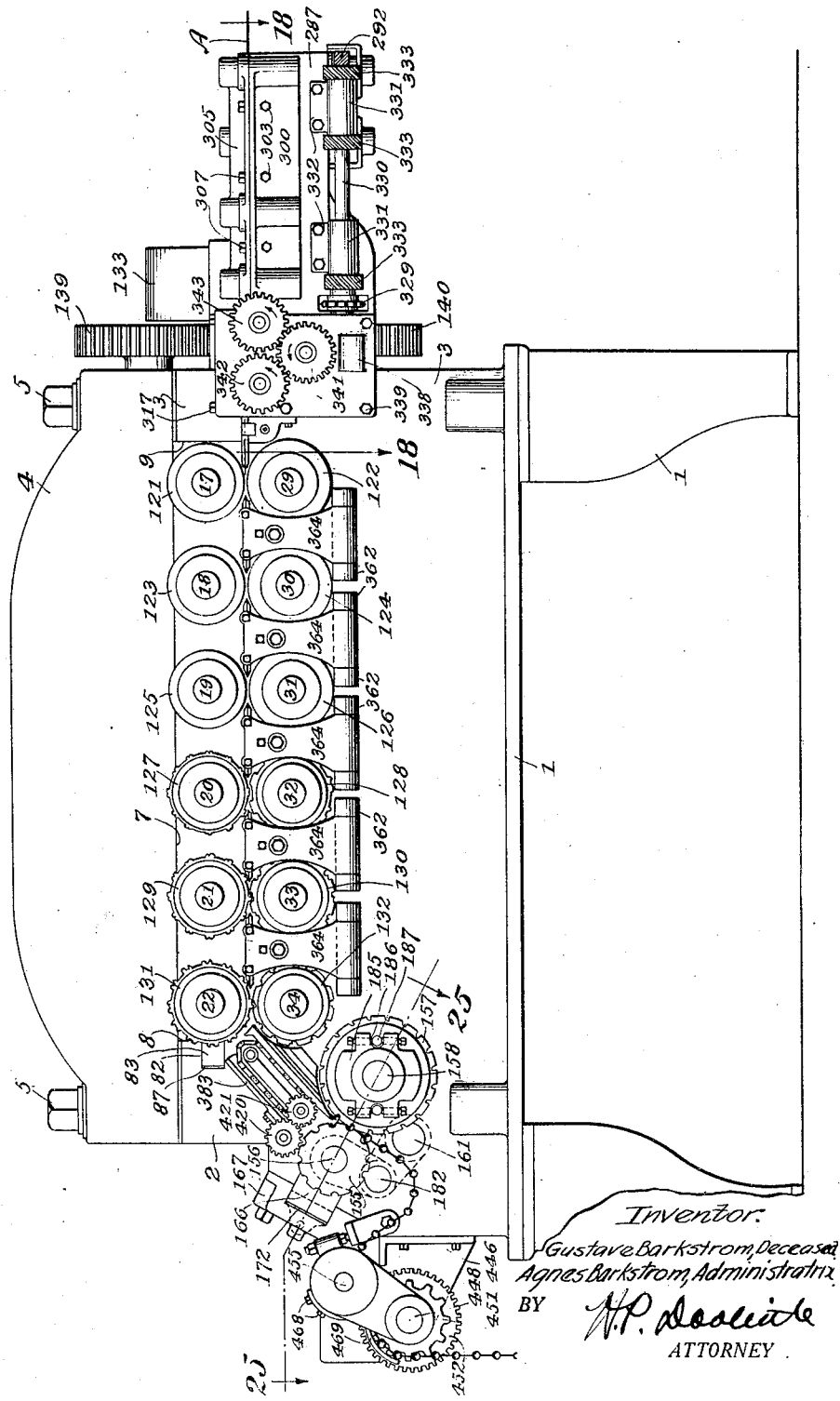
Figure 1 is an elevational view of a machine illustrating one way of carrying out the invention, looking at the side thereof opposite the drive side, the improved apparatus being incorporated in the machine.

In the drawings, 1 indicates the base of the machine frame, 2, 3 vertical uprights at the opposite ends of the base extending transversely thereof, and 4 represents the top of the machine frame resting upon the uprights 2, 3 and bolted thereto as indicated at 5. The base 1 and top 4 provide spaced apart, parallel, horizontal surfaces 6, 7, and the uprights 2, 3 provide spaced apart, parallel, vertical surfaces 8, 9, said surfaces 6, 7, 8 and 9 defining a rectangular opening 10 extending transversely through the frame.

The machine includes oppositely disposed, forwardly driven rolls, there being an upper roll and a lower roll for each operation, or segregated series of operations, required to produce chain, and the rolls are arranged so that all of the operations will synchronize.

As shown, there are six sets of rolls or rotatable dies for the link outlining and forming operations to be performed in the machine, one set for each outlining or forming operation (or segregated series of operations), and said upper rotatable dies and lower rotatable dies, respectively, are located with respect to each other to position in a single horizontal plane the whole length of the strip metal being operated upon. Said upper and lower rotatable dies of a set have proper relation to best perform their intended function.

The six sets of rolls or rotatable dies for the link outlining and forming operations are all upon shafts situated in the rectangular opening 10 extending through the frame, and the manner of adjustably locating the shafts to synchronize the link outlining and forming operations upon the machine will be most clear from Figs. 1, 2, 4, 5, 6, 7 and 8. In said figures, 11, 12, 13, 14, 15, 16 represent upper roll bearings having shafts 17, 18, 19, 20, 21, 22 and 23, 24, 25, 26, 27, 28 represent lower roll bearings having shafts 29, 30, 31, 32, 33, 34. The bearings 11 23; 12 24; 13 25; 14 26; 15 27; 16 28; respectively, are opposite each other.

All of the bearings are spaced apart, are situated transversely of the frame and parallel with each other, the upper bearings are separately adjustable from and toward the lower bearings, all of the bearings are separately adjustable horizontally so that each upper and lower bearing can be closer to or farther from the bearing or bearings adjacent it and in the same horizontal plane, the upper bearings are adjustable longitudinally, and all of the bearings are adapted to be securely clamped or wedged in the rectangular opening 10.

Figure 5:
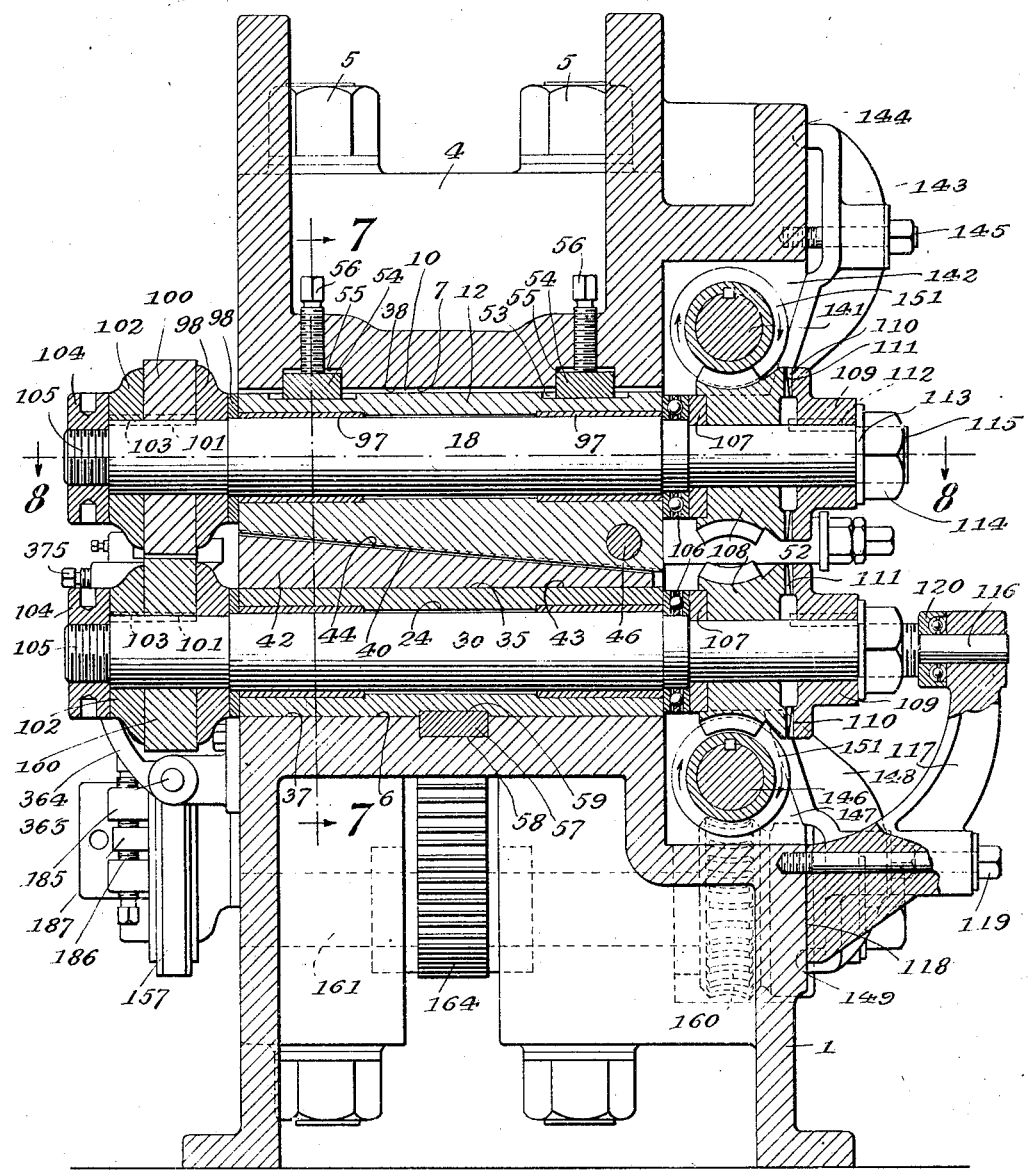
Fig. 5 is a sectional view, on line 5—5 in Fig. 4.
Figure 6:
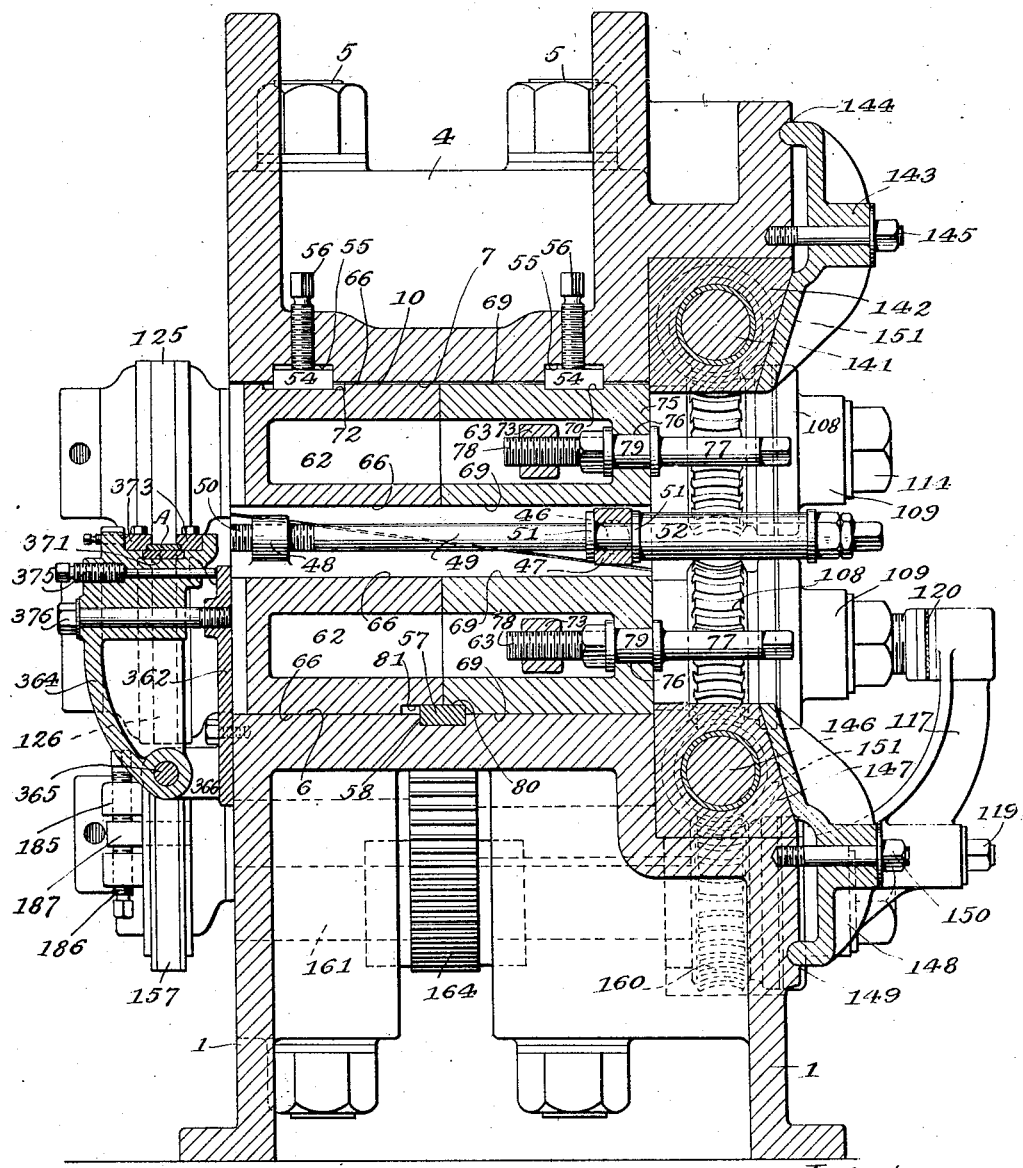
Fig. 6 is a sectional view, on line 6—6 in Fig. 4.
Figure 7:
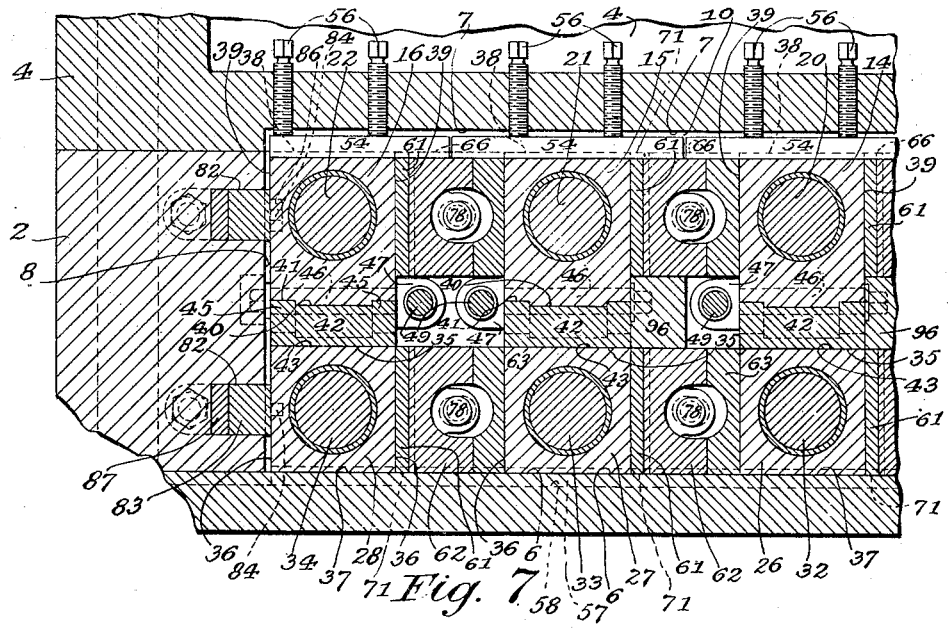
Fig. 7 is a fragmentary sectional view, as on line 7—7 in Fig. 5.

As disclosed more clearly in Figs. 5, 6 and 7, the lower bearings 23, 24, 25, 26, 27, 28 rest directly upon the smooth lower surface 6 of the rectangular opening 10 of the machine frame, while all of the upper bearings 11, 12, 13, 14, 15, 16 are adjustably supported upon the lower bearings. Each lower roll bearing is desirably rectangular or square in cross-section, preferably including a flat, horizontal upper surface 35, vertical and parallel side surfaces 36 and a flat, horizontal lower surface 37, while each upper roll bearing preferably has a flat, horizontal upper surface 38, vertical and parallel side surfaces 39, and a lower surface which includes a central beveled tongue 40 extending the length of the bearing between beveled surfaces 41 at each side of the tongue. Numeral 42 indicates an adjusting wedge, one for each upper bearing, situated between the upper flat surface of a lower bearing and the lower beveled surface of the upper bearing adjacent said lower bearing, 43 indicating the flat lower face of said wedge, 44 a beveled groove in the upper face thereof in which the tongue 40 is slidable, and 45 beveled surfaces at the opposite sides of said groove and adapted to be slidable over the beveled surfaces 41 at each side of the tongue 40 (see Figs. 5, 6 and 7).

The mechanism for sliding each wedge 42 upon the lower and upper bearings to move each upper bearing away from the lower bearing opposite it, or allow each upper bearing to move by gravity toward said lower bearing, is best disclosed in Figs. 5, 6, and 7. As there shown, 46 denotes a small bolt secured transversely in each upper bearing in any suitable or convenient manner, and 47 indicates an eye upon each bolt situated at one side of an upper bearing. 48 is an internally threaded eye at the corresponding side of each wedge 42. 49 is an adjusting screw, one for each upper bearing, having its threaded end 50 rotatably situated in said threaded eye 48 and passing through the eye 47 of small bolt 46, the adjusting screw 49 having collars 51 engaging the eye 47 to fix said adjusting screw against longitudinal movement. Each adjusting screw includes a distance piece 52 whereby it can be readily accessible.

Clearly, rotation of the adjusting screw 49 in one direction forces the corresponding upper and lower rolls apart, while rotation of said screw 49 in opposite direction allows an upper roll to move by gravity toward its corresponding lower roll.

Each upper roll bearing includes spaced apart, transverse slots 53 adapted to receive clamping blocks 54 one for each upper roll bearing, which protrude from continuous slots 55 in the upper surface 7 of the rectangular opening 10 of the frame. Clamping screws 56 situated in the frame top 4 and entering the slots 55 serve to force the clamping blocks 54 into firm engagement with the upper roll bearings (see Fig. 5). The clamping blocks 54 are of width to nicely fit the slots 55 in the frame. Each slot 53 in an upper roll bearing is preferably in length the full width of the bearing to allow for horizontal adjustment (see Fig. 7), and it is in width greater than the width of each clamping block 54 to allow for separate longitudinal adjustment of each upper roll bearing (see Fig. 5).

Numeral 57 indicates a key or keys fitted in a longitudinal slot 58 in the lower surface 6 of the rectangular opening 10 and fitted in transverse slots 59 extending the full width of the lower face of each lower roll bearing.

It will be evident that the mechanism described will adjust the upper roll bearings vertically and is designed to clamp the upper and lower roll bearings between the clamping screws 56 and the lower surface 6 of the rectangular opening 10 of the machine frame.

Figure 4:
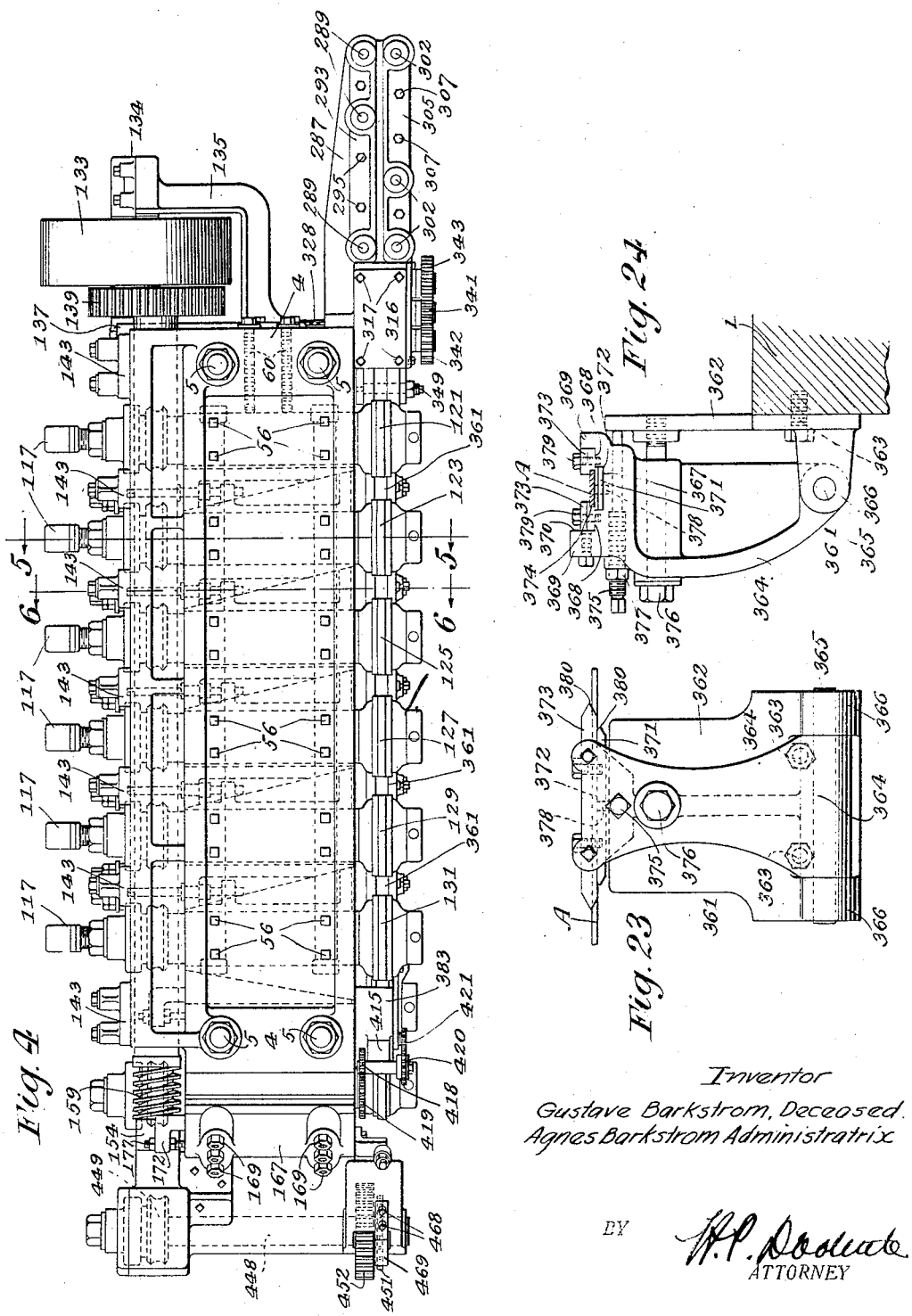
Fig. 4 is a top plan view of the machine.

The upper roll bearing 11 and the lower roll bearing 23, at the right hand end of the machine in Figs. 1 and 4, are in firm engagement with adjusting screws 60 in the vertical upright 3 of the rectangular opening 10 of the machine frame, which screws 60 locate said bearings horizontally in the rectangular opening 10 of the frame.

The other roll bearings are spaced from said roll bearings 11 and 23 and from each other to be horizontally adjustable separately, by mechanism which is the same for all of the upper roll bearings, and the same for all of the lower roll bearings.

Of each upper roll bearing spacing mechanism, 61 denotes a spacer of hard smooth metal engaging the vertical surface 39 of an upper roll bearing, and 62 and 63 denote wedges between said spacer 61 and the vertical surface 39 of an adjacent upper roll bearing. Each wedge 62 includes a flat surface 64 engaging a spacer 61, a beveled surface 65 opposite the flat surface, and upper and lower desirably flat, parallel surfaces 66. Each wedge 63 includes a flat surface 67 engaging a vertical surface 39 of an upper roll bearing, a beveled surface 68 opposite said flat surface 67, and upper and lower desirably flat, parallel surfaces 69. The wedges 63 engaging the vertical surfaces 39 of the upper roll bearings are adapted to have no movement in longitudinal direction, and to this end each upper surface 69 of each wedge 63 has spaced apart transverse slots 70 into which the clamping blocks 54 fit. See Fig. 6. Also, the spacers 61 have no longitudinal movement transversely of the frame, slots 71 therein being entered by the clamping blocks 54. The wedge 62 is adapted to be moved longitudinally relatively to the wedge 63, the beveled surface 65 then sliding over the beveled surface 68, to move the upper roll bearings away from each other or to allow them to be moved toward each other, slots 72, in the upper surfaces of the wedges 62 and receiving clamping blocks 54, being of width greater than the width of said clamping blocks to allow said wedges to be adjusted transversely of the frame. See Fig. 6. (Slots 72 are at the left hand side in said figure).

Figure 8:
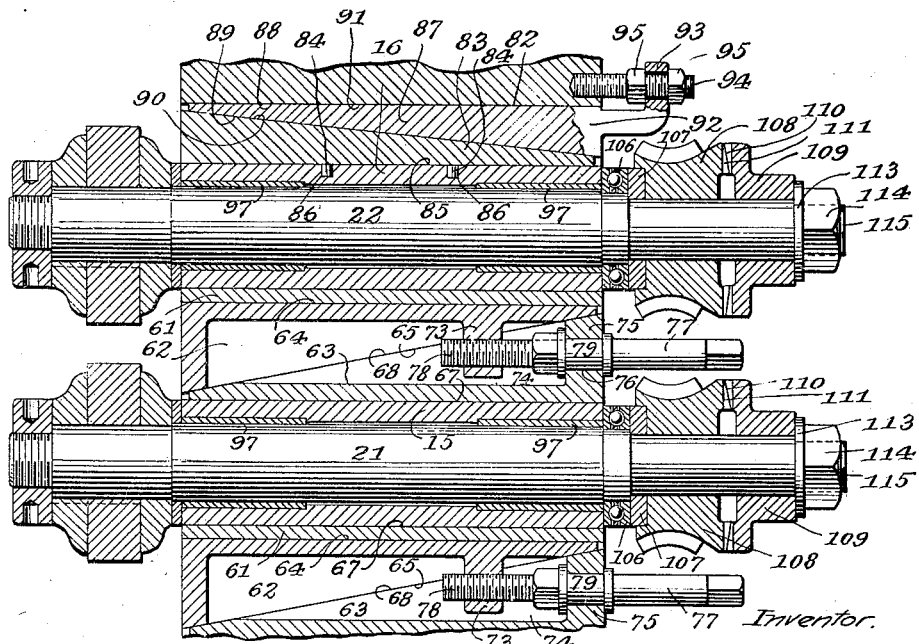
Fig. 8 is a fragmentary sectional view, as on line 8—8 in Fig. 5.

The manner in which the wedges 62 are manipulated is most clear in Figs. 6, 7 and 8. The movable wedges 62 are there shown as each having an interior threaded eye 73 at its cut-out interior 74, and each wedge 63 fixed against longitudinal movement has an end wall 75 with opening 76 to receive a small adjusting screw 77 having its threaded end 78 engaging the eye 73. Collars 79 upon each adjusting screw 77 and engaging the inner and outer faces of end wall 75 fix the screw 77 against longitudinal movement.

The lower roll bearing horizontal adjusting or spacing mechanism is similar in all respects to the upper roll bearing adjusting or spacing mechanism, except that each wedge 63 of the lower adjusting mechanism fixed against longitudinal movement has a slot 80 in its lower surface 37 which the key 57 fits, and has in the lower surface of its movable wedge 62 a slot 81 wider than said key 57 to clear said key when adjustments are to be made. See Fig. 6. The key 57 fits slots 71 in the spacers 61.

Mechanism is provided at the left hand end of the machine in Figs. 1 and 4 to take up any space which may exist between either roll bearing 16 or 28 and the surface 8 or upright 2 of the rectangular opening 10, to thus clamp all of the upper and lower roll bearings against horizontal movement longitudinally of the frame when set at desired distances apart in the manner stated. The mechanism for thus clamping the upper roll bearings may be a duplicate of that for clamping the lower roll bearings, and is best disclosed in Figs. 1, 7 and 8. Of each of these mechanisms, 82 is a transverse slot in the surface 8 of the rectangular opening 10, 83 is a wedge having pins 84 upon its flat face 85 adapted to fit slots 86 in a roll bearing 16 or 28, as the case may be, whereby said wedge 83 is fixed against longitudinal movement, and 87 is a wedge having its flat surface 88 in engagement with the base of the slots 82 and its beveled surface 89 slidable over the beveled surface 90 of said wedge 83. Each movable wedge 87 is wholly within a transverse slot 82, while each wedge 83 may be partially within and partially without said transverse slot. See Figs. 7 and 8. The base 91 of each transverse slot 82 is desirably parallel with the surface 8 of the rectangular opening 10, and the slots 86 in the upper roll bearing 16 are elongated vertically (see Fig. 7) to afford no interference to vertical adjustment of said upper roll bearing 16.

An end 92 of each movable wedge 87 has an extension piece with angular bend and eye 93 adapted to receive a clamping screw 94 which enters the machine frame. Lock nuts 95 upon each clamping screw 94 and adapted to engage opposite faces of each eye 93 can, evidently, be manipulated to modify the position of each movable wedge 87. Clearly, the movable wedges 87 can be withdrawn slightly to allow sufficient space for adjusting the roll bearings, and after the adjustments are made, said movable wedges 87 can be forced inwardly (see Figs. 7 and 8), to lock all of the roll bearings against movement in the rectangular opening 10.

All of the upper roll bearing spacing mechanisms, between the roll bearings 11, 12; 12, 13; 13, 14; 14, 15; and 15, 16 are preferably loosely supported in some convenient and suitable manner. As disclosed, the horizontally spacing mechanism between the roll bearings 15 and 16 is supported upon the eyes 47, 48 of the vertically spacing mechanisms beneath the roll bearings 15 and 16 (see Fig. 7), the eyes of said vertically spacing mechanism beneath said upper roll bearing 16, naturally, extending to the right, away from the machine frame, while the eyes of all of the other of said vertically spacing mechanisms extend to the left. All of the other of the upper horizontally spacing mechanisms are supported upon eyes of the vertically spacing mechanisms beneath them, and by spacer blocks 96 which blocks rest upon the lower horizontally spacing mechanisms beneath them. See Fig. 7.

The manner in which each of shafts 17 29; 18 30; 19 31; 20 32; 21 33; and 22 34 is rotatably mounted in its bearing to be fixed against longitudinal movement is very clearly disclosed in Figs. 5 and 8. As there shown, 97 are spaced bushings upon each shaft and within the bearings. 98 is a washer engaging the left end of each roll bearing in said Figs. 5 and 8. 99 is a tight collar upon each roll shaft against said washer 98. 100 is a rotatable die keyed to a shaft as at 101. 102 is a collar longitudinally slidable upon each shaft keyed to the shaft as at 103 and adapted to engage each rotatable die. 104 is a clamping nut upon the threaded end 105 of each shaft and adapted to be tightened against each longitudinally slidable collar. 106 is a thrust bearing upon each shaft engaging the right end of each roll bearing in Figs. 5 and 8. 107 is a washer next to each thrust bearing 106. 108 is a worm gear upon each shaft next the washer 107. 109 is a collar next each worm gear and having teeth 110 to intermesh with teeth 111 upon the right side of the worm gear in Figs. 5 and 8, each collar 109 being longitudinally slidable upon each shaft and keyed thereto as at 112. 113 is a washer next each collar 109, and 114 is a clamping nut upon the threaded right end 115 of each shaft. Clearly, turning the clamping nuts 104 and 114 home fixes the shafts in the roll bearings, and locates the rotatable dies 100 and worm gears 108 upon the shafts. The toothed engagement between each worm gear 108 and each collar 109 provides an arrangement for advancing or retarding said worm gear before it is clamped against its collar.

There is a thrust toward the right upon each lower roll shaft in Fig. 5, so that when all of the roll bearings shall have been adjusted, the right reduced end 116 of each lower roll shaft is located in a thrust bracket 117 clamped to the frame as at 118 as by a clamping screw 119. 120 are thrust bearings, one upon the reduced portion of each lower roll shaft, between the thrust bracket 117 and the end of the threaded portion 115 of each lower shaft.

There is a rearward or first set of rolls or rotatable dies for the first operation (or series of segregated operations) in the machine, including an upper rotatable die 121 upon shaft 17, and a lower oppositely disposed rotatable die 122 upon shaft 29. These dies include in their structure the forming tools for longitudinally scoring the links to outline the side bars of the individual links of the chain to be produced. See Figs. 9, 9a and 9b.

The second set of rolls, for the second operation (or series of segregated operations), include oppositely disposed upper rotatable die 123 upon shaft 18 and lower rotatable die 124 upon shaft 30. These dies include in their structure the forming tools for transversely scoring the metal of the links between the longitudinal scores defining the side bars, to outline, together with said longitudinal scores, the central portion or long lip of each link blank to be employed in forming the large end or sprocket bar of the link, and the central portion or narrow lip of the small end bar or pintle of said link. See Figs. 10, 10a and 10b.

The third set of rolls, for the third operation (or series of segregated operations), include oppositely disposed upper rotatable die 125 upon shaft 19 and lower rotatable die 126 upon shaft 31. These dies include in their structure the severing and forming tools for severing and crimping or forming the free end of the central portion or long lip of the link blank to be employed in forming the large end or sprocket bar of the link, for severing and crimping or preliminarily forming the central portion or short narrow lip of the small end bar or pintle of said link, and for throwing said central portion or narrow lip of the small end bar or pintle slightly upwardly, and said free end of said central portion or long lip of the sprocket bar slightly downwardly. See Figs. 11, 11a and 11b.

The fourth set of rolls, for the fourth operation (or series of segregated operations), include oppositely disposed upper rotatable die 127 upon shaft 20 and lower rotatable die 128 upon shaft 32. These dies include in their structure the severing and forming tools for severing the body of said central portion or long lip of the link blank adjacent its severed and crimped or formed end, for throwing said central portion or long lip of the link blank slightly upwardly, for throwing the central portion or narrow lip of the small end bar or pintle further upwardly, and for preliminarily forming the short, wide lip of the large end or sprocket bar and the short, wide lip of the small end bar or pintle. (See Figs. 12, 12a, and 12b.

The fifth set of rolls, for the fifth operation (or series of segregated operations), include oppositely disposed upper rotatable die 129 upon shaft 21 and lower rotatable die 130 upon shaft 33. These dies include in their structure the working tools for imparting a transverse score to the strip of metal along the line of severance of two links which are to adjoin each other, for bending, forming, or shaping the short, wide lip of the small end bar or pintle further downwardly and to final form, for throwing the short, narrow lip of the small end bar or pintle still further upwardly, to approximately vertical position, for throwing the short, wide lip of the sprocket bar further downwardly and the severed long, narrow lip thereof further upwardly, and for bending, forming, or shaping said short, wide lip of the sprocket bar to final form. The fifth set of dies operate upon the small end bar or pintle of a link at the rear of each transverse score and operate upon an adjacent large end or sprocket bar in front of the location of transverse scoring. See Figs. 13, 13a and 13b.

The sixth set of rolls, for the sixth operation (or series of segregated operations), include oppositely disposed upper rotatable die 131 upon shaft 22 and lower rotatable die 132 upon shaft 34. These dies include in their structure the severing and forming tools for severing each link from the strip, for bending, forming, or shaping the short, narrow lip of the small end bar or pintle to final form, and simultaneously operating upon said small end bar or pintle to position it at desired angle with respect to the link side bars, and for throwing the short, wide lip of the large end or sprocket bar of the link further downwardly, and the long, narrow lip thereof further upwardly, in order that the end hook will be in its final forming and assembling position. The sixth set of dies operate upon the small end bar or pintle of a link at the rear of each severed link, and operate upon the large end or sprocket bar of each link while it is being severed and immediately thereafter. See Figs. 14, 14a and 14b.

Figure 2:
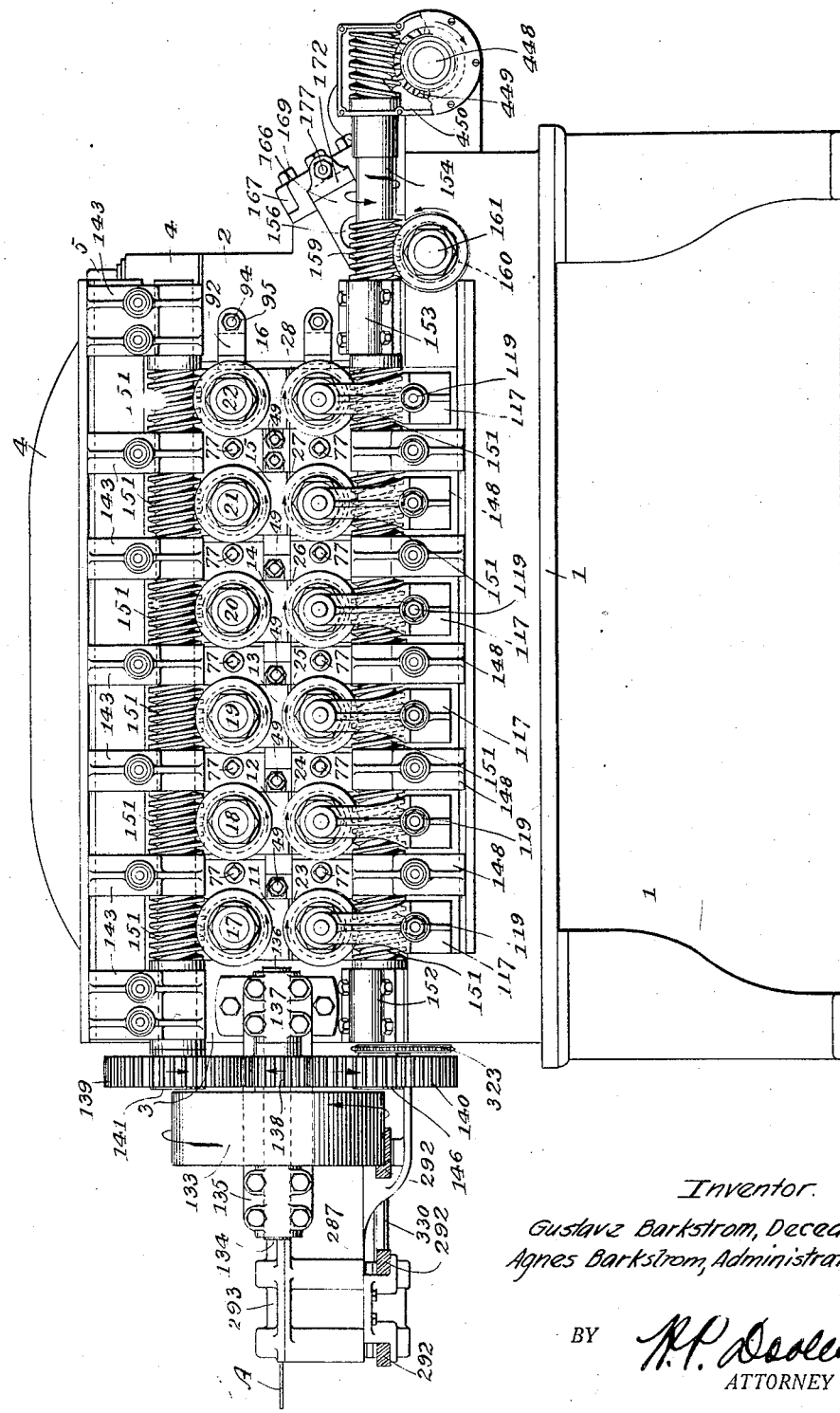
Fig. 2 is an elevational view looking at the drive side of the machine.
Figure 3:
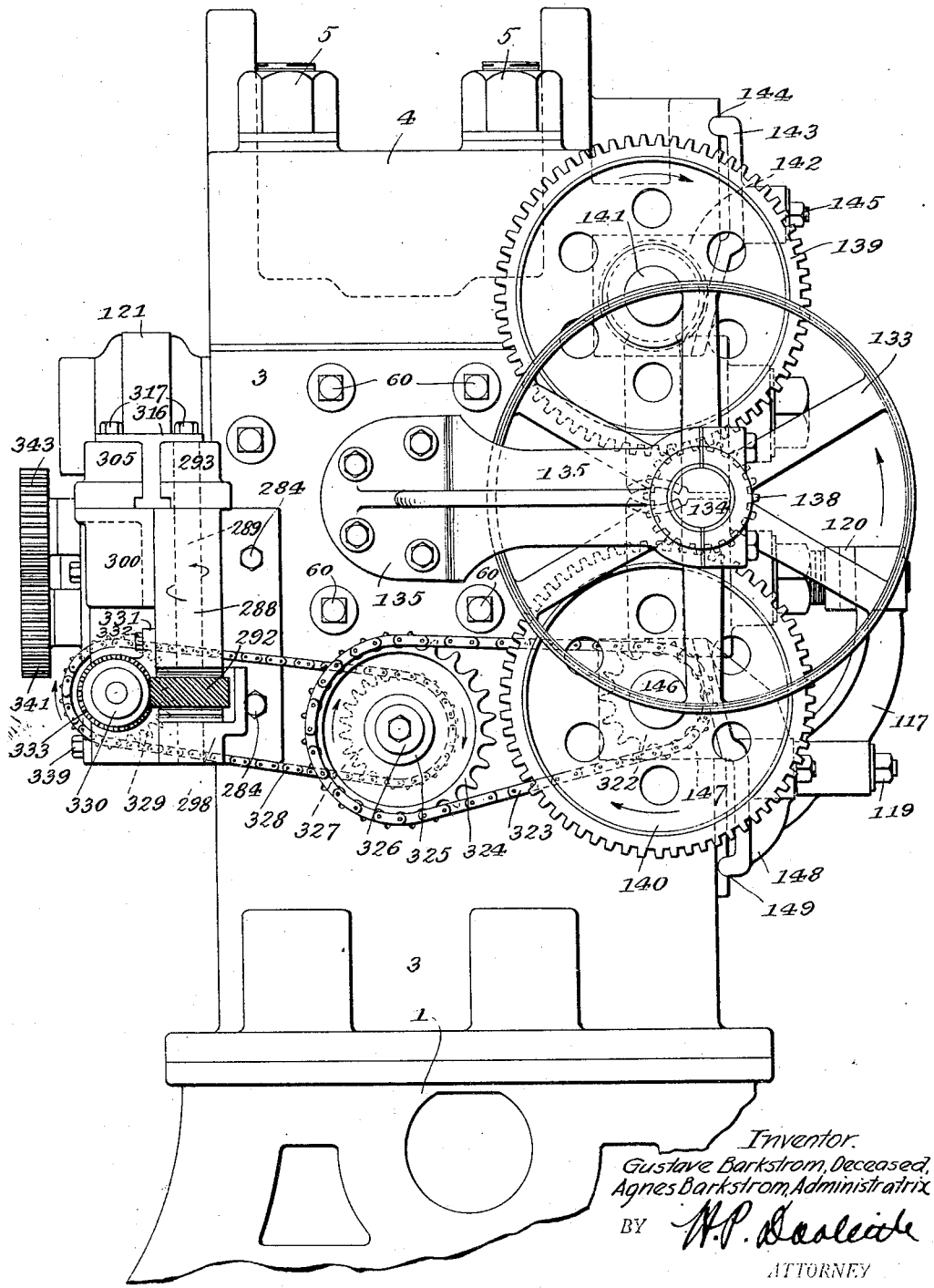
Fig. 3 is an end view of the machine showing the belt pulley and associated parts.

The rotatable dies of the six sets already described are driven forwardly in the manner best disclosed in Figs. 2 to 6. 133 is a belt pulley fixed upon the short shaft 134 having its end portion adjacent the belt pulley mounted in a bracket 135 upon the rear end of the frame and its other end portion 136 mounted in a bracket 137 upon a side edge of the frame upright 3, see Figs. 2 and 3. A small gear 138 upon the short shaft 134 and between the belt pulley and bracket 137 meshes with a large gear 139 above it and with a similar large gear 140 beneath it. The large gear 139 is fixed upon a shaft 141 extending the length of the frame and mounted in bearings 142 held in position against the frame top 4 by brackets 143 each clamped to the frame top as at 144 by a clamping screw 145. See Fig. 6. Similarly, the large gear 140 is fixed upon a shaft 146 extending the length of the frame and mounted in bearings 147 held in position against the frame base 1 by similar brackets 148 each clamped to the frame base as at 149 by a clamping screw 150. See Fig. 6.

Each shaft 141 and 146 includes worms 151, there being a worm 151 adapted to engage each gear upon each rotatable die shaft to rotate all of said gears in the same direction and thus drive the rotatable dies forwardly, as will be clear. There is a bearing with bracket between each worm 151, and in the case of the upper shaft 141 there are bearings with brackets beyond the outermost roll shafts 17 and 22. See Fig. 2. In the case of the lower shaft 146, 152 is a bearing fixed upon the frame end member 3 adjacent the large gear 140, and 153 is a bearing fixed upon the frame member 2. An extension 154 of said lower shaft 146 beyond bearing 153 is for purposes to be explained.

There is upon the machine a seventh, or assembling, set of rolls, for the last operation (or series of segregated operations) to provide chain. This set of rolls includes oppositely disposed rotatable die 155 upon shaft 156 and rotatable die 157 upon shaft 158, having elevation with respect to each other as very clearly disclosed in Figs. 15 and 27. These dies preferably include in their structure the final end hook shaping and link assembling tool.

The manner in which the rotatable dies 155 and 157 of the assembling set of rolls are mounted, are adjustable to synchronize the operations, and are driven, will be better understood by reference to Figs. 1, 2, 4, 25, 26 and 27. The extension 154 of the shaft 146 has a worm 159 which meshes with a gear 160 fixed upon a shaft 161 mounted in bearings 162 upon the frame. The shaft 158 having the rotatable die 157 is mounted in bearings 163 upon the frame. A gear 164 fixed upon the shaft 161 driven from the worm 159, meshes with a gear 165 fixed upon the shaft 158 having the rotatable die 157. 166 is a bearing block for shaft 156 having rotatable die 155. This bearing block is adjustably supported from a cover plate 167, bolted to the frame as at 168, by means of screw bolts 169 in said cover plate and entering said bearing block. The bearing block 166 is partially situated within the cover plate as indicated at 170 to be slidable therein, and the surface of said bearing block adjacent the cover plate is beveled as indicated at 171. A wedge 172 within the cover plate and having a flat surface 173 slidable over the inner flat surface 174 of the cover plate, has a beveled surface 175 adapted to engage the beveled surface 171 of the bearing block. An eye 176 upon an end of the wedge 172 receives a screw 177 located in the frame. Adjusting nuts 178 upon the screw and engaging opposite faces of the eye 176 insure any adjusted position of said wedge. Clearly, by withdrawing the wedge 172 the screw bolts 169 can be turned to adjust the bearing block 166 relatively to the cover plate 167, and by then forcing the wedge in, the adjusted position of the bearing block 166 is insured. The wedge 172 is slotted to clear the screw bolts 169. Shaft 156 is mounted in the bearing block 166 as indicated at 179 and carries a gear 180 adapted to mesh with an idler gear 181 upon a shaft 182 having each of its opposite ends mounted in a pair of short links 183 and 184, the links 183 being also situated upon the shaft 156 and the links 184 being also situated upon the shaft 161. The idler gear 182 is adapted to mesh with the gear 180 fixed upon the shaft 156. As will be most clear from Figs. 25 and 26, this arrangement provides for allowing adjustment of the shaft 156 carried by the bearing block 166 and having the rotatable die 155, from and toward the shaft 158 having the rotatable die 157 to advance or retard said rotatable die 155 and to bring it nearer to or farther from the rotatable die 157, without removing the gear 180 from its meshing relation with the idler gear and the idler gear from its meshing relation with the gear 164. The rotatable die 157 is adjustably fastened to its axis, to be advanced or retarded to synchronize its operation with that of the rotatable die 155, as by drivers 185 keyed to the shaft 158 and having adjustable set screws 186 adapted to engage pins 187 rigid upon the rotatable die. See Figs. 1 and 25. The shafts 158 and 161 may be fixed in the frame against longitudinal movement in any convenient manner, as may also the shaft 156 be fixed in the bearing block 166, and the rotatable dies 155 and 157 may be fixed against longitudinal movement upon the shafts 156 and 158, respectively, in any suitable fashion. Likewise, the gears 160, 164, 180 and 165 are fixed against longitudinal movement upon the shafts 161, 156 and 158 in any convenient way, and the links 183 and 184 are located upon the shafts 156, 161 and 182 to keep the idler gear in alignment with said gears 180 and 164. Evidently, rotation of the shaft 161 in the direction of the arrow in Fig. 26 causes gear 164 to rotate the rotatable die 157 in the direction of the arrow upon said die in Fig. 27, and causes said gear 164 to rotate the idler gear which in turn rotates the rotatable die 155 in the direction of the arrow upon said die in said Fig. 27. That is to say, the rotatable dies 155 and 157 are driven forwardly in the manner fully set forth.

Each rotatable die of the seven sets of rolls already mentioned contains a plurality of duplicate chain forming elements, and the tools of the elements of the opposite dies of each set of rolls are complements of each other, there being as many elements upon each lower die as there are elements upon the upper die opposite it, and the elements of the upper and lower die of a set are correspondingly arranged about the circumferences or peripheral margins of the dies to cooperate with each other in performing the particular work to be performed. The word "element", as herein used, refers to a tool (or series of tools) of a die to cooperate with a duplicate or complemental tool (or series of tools) of an oppositely arranged die in performing a working operation (or series of operations) in the machine.

As before mentioned, the rearward or first set of dies, to accomplish the first operation (or series of segregated operations) in the machine, may include the forming tools for longitudinally scoring the links to outline the side bars of the individual links of the chain to be produced.

188 are scoring knives of the duplicate elements arranged upon the upper rotatable die 121 of the first set of rolls adapted to impart lines of score to the upper surface of a strip of metal, which lines are aparallel in the direction of the feed of the strip. 189 are scoring knives of the duplicate elements upon the lower die 122 of the first set corresponding with the scoring knives 188 and arranged to impart lines of score to the under face of the strip of metal, each of which lines is directly beneath a line of score imparted by one of the upper scoring knives 188.

The second set of dies, to accomplish the second operation (or series of segregated operations), may include the forming tools for transversely scoring the metal of the links between the longitudinal scores defining the side bars, to outline, together with said longitudinal scores, the central portion or long lip of each link blank to be employed in forming the large end or sprocket bar of the link, and the central portion or narrow lip of the small end bar or pintle of said link.

190 are scoring knives of the duplicate elements of the upper die 123 of the second set of rolls adapted to impart lines of score at right angles to the lines imparted by the scoring knives 188, these scoring knives 190 being adapted to impart their transverse lines of score not far from the forward ends of the longitudinal lines of score made by the scoring knives 188 to span the distance between the longitudinal lines of score. 191 is a scoring knife of each element of the lower die 124 of the second set, corresponding with each transverse scoring knife 190, to impart its transverse line of score directly beneath a line of score of a knife 190.

The third set of dies, to accomplish the third operation (or series of segregated operations), may include the severing and forming tools for severing and crimping or forming the free end of the central portion or long lip of the link blank to be employed in forming the large end or sprocket bar of the link, for severing and crimping or preliminarily forming the central portion or short, narrow lip of the small end bar or pintle of said link, and for throwing said central portion or short, narrow lip of the small end bar or pintle slightly upwardly and the free end of said long, narrow lip of the sprocket bar slightly downwardly.

192 represents each of the severing, crimping and forming elements of the lower die 126 of the third set of rolls, and 193 represents each of the complemental severing, crimping, and forming elements of the upper die 125 of said third set. The elements 192 and 193 are essentially for the purposes of breaking through the metal on the lines of score made by the knives 190, 191, and portions of the lines of score made by the knives 188, 189, adjacent the lines of score made by said transverse scoring knives 190 and 191, of crimping or forming the free end of the long, narrow lip of the large end or sprocket bar, of crimping or preliminarily forming the short, narrow lip of the small end bar or pintle, and of throwing said short, narrow lip slightly upwardly. As shown, each element 192 includes a severing and crimping punch 194 having a forward, concave, arc shaped crimping surface 195 merging in the circumference of said die 126, and defining a transverse crimping edge 196; a rearward, concave, substantially quarter-circle crimping surface 197, merging in a curved surface 198 in the face of the die 126 itself merging at 199 in the circumference of said die 126, and defining a transverse crimping edge 200; and parallel side faces 201, perpendicular to the crimping edges 196, 200, and defining severing edges 202. The curved surface 198 within the periphery of die 126 has side faces perpendicular to the die axis defining parallel severing edges 203 perpendicular to the axis of said die 126. Each element 193 is constituted by a depression 204 in the peripheral face of the die 125 to receive the severing and crimping punch 194. The forward portion of the depression 204 is defined by an approximately radial face 205 providing a convex crimping surface 206 to cooperate with the crimping surface 195 and crimping edge 196 in crimping or preliminarily bending, shaping, or forming the central portion or narrow lip of the small end bar or pintle of a link and throwing said lip slightly upwardly as it is severed along the lines of score by the punch 194. To the rear of the radial face 205 the depression 204 has parallel side walls 207, perpendicular to the axis of the die 125, defining spaced apart severing edges 208 perpendicular to the crimping surface 206. The rearward portion of each depression 204 is defined by an approximately radial face 209 merging in a transverse, substantial part-circle surface 210 of a protuberance 211 upon the die 125 itself merging at 212 in the circumference of said die 125. The part-circle 210 of the protuberance 211 is a convex crimping surface to cooperate with the crimping edge 200, crimping surface 197 and curved surface 198 in displacing the forward or free end of the central portion or long, narrow lip of the large end or sprocket bar slightly downwardly and in simultaneously crimping or forming said forward or free end. The protuberance 211 has parallel side faces 213 perpendicular to the radial face 209 defining spaced apart severing edges 214 perpendicular to the part-circle 210 and adapted to cooperate with the severing edges 203. The action of the severing edges 202, 203 and 209, 214, is to sever the metal of a link blank along the lines of score made by the scoring knives 188, 189, adjacent the line of score made by the knives 190, 191, and the action of the severing and crimping punch 194 is to simultaneously sever the metal of said blank along the lines of score made by said scoring knives 190, 191, whereby the crimping edges and crimping surfaces at the front and rear of each element 192 and 193 can operate in the manner described. The combined action of the crimping surface 210 of the protuberance 211 and crimping edge 200, crimping surface 197, and curved surface 198, as illustrated, is to throw the severed free end of the central portion or long lip of the large end or sprocket bar slightly downwardly below the plane of the strip of metal and to give to said free end substantially a quarter-circle crimp, and the combined action of the crimping surface 206 and crimping surface 195 and crimping edge 196 is to throw the severed narrow lip of the small end bar or pintle slightly upwardly above the plane of the strip of metal and to give to said narow lip a crimp or preliminary forming which is less than a quarter-circle.

The fourth set of dies, to accomplish the fourth operation (or series of segregated operations), may include the severing and forming tools for severing the body of the central portion or long, narrow lip of the link blank adjacent its severed and crimped or formed end, for throwing the central portion or long lip upwardly to a position slightly above the plane of the strip of metal, for throwing the central portion or narrow lip of the small end bar or pintle further upwardly, and for preliminarly forming the short, wide lip of the large end or sprocket bar and the short, wide lip of the small end bar or pintle.

Each of the elements 215 of the lower die 128 of the fourth set of rolls includes a transverse, concave, crimping surface 216, less than a quarter-circle. Directly to the rear of the surface 216 and contiguous therewith is a transverse, concave, crimping surface 217, also less than a quarter-circle, said surfaces 216 and 217 extending the full width of the die 128 and meeting each other at the transverse line 218 which is a slight distance away from the circumference of the die 128, within the confines of said die. At the rear end 219 of the surface 217, which terminates in the circumference of the die 128, is a crimping punch 220 having a transverse, oblique, forward crimping face 221, of less width than the die and arranged centrally thereof, extending outwardly from said rear end 219 and the perimeter of said die. The crimping punch 220 also has a transverse, oblique, rearward crimping face 222 of width equal to said forward crimping face 221. To the rear of the crimping face 222 there is a shearing projection 223 having outer face 224 a continuation of the crimping face 222, which shearing projection 223 extends inwardly and rearwardly on a short, smooth curve and terminates in the circumference of the die 128. The shearing projection 223 has parallel side faces 225 perpendicular to the outer face 224, defining circumferentially extending cutting edges 226 for shearing the metal of a blank along the line of score made by the scoring knives 188, 189 to define the body of the central portion or long, narrow lip of the large end or sprocket bar, the free or outer end of said long lip having been severed and crimped in the third set of rolls. The transverse, smooth, short, curved surface 224 merges in the perimeter of the die 128 at a location 227 in advance of the forward end 228 of a crimping surface 216 of the adjacent rearward element 215. Each element 229 of the upper die 127 of the fourth set of rolls includes an end-bar-defining punch 230 consisting of a pair of transverse, convex crimping surfaces 231 and 232, complemental to the surfaces 216 and 217, respectively, of the die 128. The crimping surfaces 231 and 232 extend the full width of the die 127, and meet each other along the transverse line 233 complemental to the transverse line 218. The upper die 127 includes approximately circular, spaced apart flanges 234 providing spaces 235 between the flanges each of approximately the width of the long, narrow lip for the large end or sprocket bar of the link. The peripheral surface of these flanges are constructed to engage the side bars of a link blank as the same passes between the rolls of the fourth set, to cooperate with the perimeter or circumference of the lower die 128 in insuring forward, horizontal feeding of the metal strip during the preliminary defining or shaping of the end bars on this, the fourth set of rolls. See Figs. 12, 12a and 12b. The inner edges of the flanges 234 provide in the case of each element 229 shearing edges 236 complemental to the shearing edges 226 of the die 128. The combined action of the cutting edges 226 and 236 is to sever the metal of the stock along the portions of the lines of score made by the scoring knives 188, 189 which define the body of the long, narrow lip of the large end or sprocket bar adjacent the forward or free end thereof, already severed and crimped or formed by the third set of rolls. The combined action of the complemental crimping surfaces 216, 231, and 217, 232 is to throw the short, wide lip of the large end or sprocket bar and the short, wide lip of the small end bar or pintle slightly downwardly and to preliminarily shape said mentioned lips. The action of the forward crimping face 221 of crimping punch 220 is to further shape the short, narrow lip of the small end bar or pintel and to throw said short, narrow lip further upwardly. The action of the rearward crimping face 222 of the crimping punch 220 and the shearing and bending projection 223 is to displace the metal for the long, narrow lip of the large end or sprocket bar slightly upwardly above the plane of the strip of metal.

The fifth set of dies, to accomplish the fifth operation (or series of segregated operations), may include the working tools for imparting a transverse score to the strip of metal along the line of severance of two links which are to adjoin each other, for bending, forming, or shaping the short, wide lip of the small end bar or pintle further downwardly and to final form, for throwing the short, narrow lip of the small end bar or pintle still further upwardly, to approximately vertical position, for throwing the short, wide lip of the large end or sprocket bar further downwardly and the severed long, narrow lip thereof further upwardly, and for simultaneously bending, forming, or shaping said short, wide lip of the sprocket bar to final form.

237 is a transverse scoring knive of the duplicate elements 238 of the lower die 130 of the fifth set of rolls to impart a transverse score to the strip of metal along the line of severance of two links which are to adjoin each other, said transverse scoring knife 237 being adapted to produce its score line at the location upon the strip metal defining the rearward end of each short, wide lip of a large end or sprocket bar of a link and the forward end of the short, wide lip of a small end bar or pintle of the next adjacent link. Directly in advance of each transverse scoring knife 237 is a transverse, concave crimping surface 239, substantially a quarter-circle, and directly at the rear of said transverse scoring knife 237 is a concave crimping surface 240, also substantially a quarter-circle, said quarter-circles 239 and 240 extending the full width of the die 130 and meeting said scoring knife at the locations 241 and 242, respectively, both of which locations 241, 242 are a slight distance away from the circumference of the die 130, within the confines of said die. At the rear end 243 of the quarter-circle 240, which terminates at the circumference of the die 130, is a bending projection 244 having a transverse, forward bending surface 245 of less width than the die and arranged centrally thereof, extending approximately radially from the perimeter of said die 130. At the front end of the quarter-circle 239, which also terminates at the circumference of the die 130, is a bending projection 246 having a rearward, transverse, curved bending surface 247, which is a continuation of the quarter-circle 239 and is also of less width than the die 130 and arranged centrally thereof, extending forwardly from the front end of said quarter-circle 239 and outwardly from the perimeter of said die. The bending projection 246 extends forwardly to the bending projection 244 of the next adjacent element 238, and its outer surface is of width to ride between the side bars of a link, and is preferably concentric with the perimeter of said die 130. Each element 248 of the upper die 129 of the fifth set of rolls includes an end bar finishing punch 249 consisting of a pair of transverse, convex crimping surfaces 250 and 251, complemental to the surfaces 239 and 240, respectively, of the die 130. The crimping surfaces 250 and 251 extend the full width of the die 129, and meet each other along the transverse line 252 adapted to come opposite the transverse scoring knife 237. The upper die 129 includes approximately circular spaced apart flanges 253 providing spaces 254 between the flanges each of approximately the width of the long, narrow lip of the large end or sprocket bar of the link. The peripheral surfaces of these flanges are constructed to engage the side bars of a link blank as the same passes between the rolls of the fifth set, to cooperate with the perimeter or circumference of the lower die 130 in insuring forward, horizontal feeding of the metal strip during the shaping of the end bars on this, the fifth set of rolls. See Figs. 13, 13a and 13b. The action of the transverse scoring knife 237 is to score the metal along the line of serverance of two links which are to adjoin each other. The combined action of the complemental quarter-circles 239, 250, and 240, 251, and of the bending projection 246 and bending surface 247 which cooperate with the quarter-circles 239, 250, and the bending surface 245 which cooperates with the quarter-circles 240, 251 is to throw the short, wide lip of the sprocket bar further downwardly and the severed long, narrow lip thereof further upwardly, and to simultaneously shape said short, wide lip to final, preferably quarter-circle, form; and to shape the wide lip of the small end bar or pintle to quarter-circle configuration and to throw the short, narrow lip of the small end bar or pintle still further upwardly to approximately vertical position. The long, narrow lip of the sprocket bar moves upwardly in a circle into a space 254 between the flanges 253 and elements 248, the curved bending surface 247 insuring desired circular movement of said long, narrow lip. The quarter-circles 239 and 250 directly engage the opposite faces of the short, wide lip of the sprocket bar to throw said short, wide lip downwardly slightly and give it a quarter-circle curve. The quarter-circles 240 and 251 directly engage the wide lip of the small end bar or pintle to give it a quarter-circle curve. The transverse score knife 237 and the location 252 engage the opposite faces of the strip of metal between the wide lips of the end bars of adjacent links during the shaping of said end bars by the quarter-circles. The bending surface 245 cooperates with a radial face 255 which is in advance of the quarter-circle 251 of the punch 249 and between the flanges 253 to throw the short, narrow lip of the small end bar or pintle still further upwardly to approximately vertical position. The bending projection 246 and curved bending face 247 engage the long, narrow lip of the sprocket bar and throw it upwardly.

The sixth set of dies, to accomplish the sixth operation (or series of segregated operations), may include the severing and forming tools for severing each link from the strip, for bending, forming, or shaping the short, narrow lip of the small end bar or pintle to final form, and for simultaneously operating upon said small end bar or pintle to position it at desired angle with respect to the link side bars, and for throwing the short, wide lip of the large end or sprocket bar of the link further downwardly and the long, narrow lip thereof further upwardly, in order that the end hook will be in its final forming and assembling position.

Each of the elements 256 of the lower die 132 of the sixth set of rolls includes a transverse, concave, substantial quarter-circle forming surface 257. Extending inwardly from the forward end of the quarter-circle 257 is a transverse, approximately radial face 258 teminating in a transverse, concave, arc shaped (substantial quarter-circle) forming surface 259 itself terminating in the perimeter or circumference of the die 132 at a distance from the quarter-circle 257. The transverse, approximately radial face 258 and forming surface 257 meet each other to define a transverse cutting edge 260 within the confines of the die 132 and at a slight distance from the circumference of said die. The part-circle surfaces 257 and 259 extend the full distance across the lower die of the sixth set of dies. In advance of the quarter-circle 259 is a bending projection 261 arranged centrally of the die 132. This bending projection 261 has a rear, transverse, curved, bending surface 262 which is a continuation of the part-circle surface 259 and extends outwardly therefrom. Between the forward end of the bending projection 261 and the rearward end of the part-circle surface 257 of the next adjacent element 256 the lower die is recessed as at 263, said recess 263 being centrally arranged in the die 132. The outer face of the bending projection 261 is of width to ride between the link side bars and is preferably concentric with the perimeter of die 132. Each of the elements 264 of the upper die 131 of the sixth set includes a severing knife or punch 265 with approximately radial face 266 defining cutting edge 267 complemental to cutting edge 260. The punch has a convex forming surface 268 in advance of the cutting edge 267 and complemental to the quarter-circle 259. The upper die includes circular spaced apart flanges 269 providing a space 270 between the flanges of approximately the width of the long, narrow lip of the large end or sprocket bar. The peripheral surfaces of these flanges are constructed to engage the side bars of a link blank as the same passes between the rolls of the sixth set, to cooperate with the lower die 132 in insuring forward, horizontal feeding of the link. The combined action of the cutting edges 260 and 267 is to sever the stock along the lines of score made by the scoring knives 237, while the action of the lower and upper forming surfaces 259, 268 and the bending projection 261 and bending surface 262 is to throw the short, wide lip of the large end or sprocket bar further downwardly and the long, narrow lip of said large end or sprocket bar further upwardly in a space 270 between the flanges 269. At the rear of the severing knife or punch 265 is a forming tool 271 having a convex forming surface 272 complemental to the quarter-circle surface 257. This forming tool 272 is centrally cut away and a crimping tool 273 having a transverse, concave, arc shaped (substantial quarter-circle) crimping surface 274, is provided between the flanges of the die 131 and at the rear of the convex forming surface 272. At the rear of the crimping surface 274 is a forming tool 275 adapted to enter the recess 263 of the lower die. The combined action of the convex forming surface 272, the quarter-circle surface 257, the arc-shaped crimping surface 274, and the forming tool 275 is to bend or shape the short, narrow lip of the small end bar or pintle to final form, and to operate upon the short, wide lip and the short, narrow lip of said small end bar or pintle to position said small end bar or pintle at desired angle with respect to the link side bars. The convex forming surface 272 and the quarter-circle surface 257 directly engage the opposite faces of the short, wide lip of the small end bar or pintle to throw said short, wide lip downwardly and thus the short, narrow lip upwardly, and the concave, crimping surface 274 engages the short, narrow lip of said small end bar or pintle while the forming tool 275 engages the location at which said narrow and wide lips connect, to round said short, narrow lip to final curvilinear form, and to cause said lip, in cooperation with said convex forming surface 272 and quarter-circle surface 257, to move forwardly and upwardly, thus placing the whole of the small end bar or pintle approximately at a right-angle to the side bars of the link. See Figs. 14, 14a and 14b.

The assembling elements are on the last, or seventh, set of rolls. The upper die 155 of the last set has elements 276 each of which includes a part-circle surface 277 preferably slightly less than a half-circle, and the lower die 157 of this set has similar, complemental elements 278 each including a part-circle surface 279 with spacing mandrel 280 arranged transversely of the die 157 to define a quarter-circle arc at the forward portion of the part-circle surface 279. At the rear of the mandrel 280 the part-circle surface 279 extends only partially across the die 157 as shown more clearly at 281 in Fig. 15b, while the remainder of the part-circle surface 279 extends the full width of said die. Obviously, the part-circle surfaces 277 and 279 are complemental, their combined action serving to roll the long lip or end hook to circular form. The spacing mandrel is for the purpose of defining a detaching slot present in the finished chain and for locating the short, wide lip of the large end or sprocket bar of the link. (The detaching slot defined in the assembling set of rolls is sized—that is, made slightly smaller in accurate manner—in the stretching and sizing mechanism upon the machine, presently to be described). The spacing mandrel 280 is arranged centrally of the die 157, and the rearward portion of the part-circle surface 279 includes spaced apart walls 282 at the ends of said spacing mandrel.

There is mechanism on the machine for straightening the strip metal, shown more clearly in Figs. 18 to 21, the strip metal straightener being situated at the rear of the dies 121 and 122 of the first set of rolls (see Fig. 1), and being adapted to act upon the strip of metal as it is fed from a storage drum (not shown), upon which it is usually wound, to the various sets of rotatable dies in the machine.

Of the strip metal straightener, 283 is a straightening roller bracket bolted to a side edge and the outer face of the frame upright 3, as indicated at 284. The straightening roll bracket may be a casting including a lower, horizontal straightening roller housing 285, a gear housing 286 beneath the straightening roller housing, and a side, vertical straightening roller bracket 287 in advance of the lower, horizontal straightening roller housing 285 and the gear housing 286. The side, vertical straightening roller bracket 287 includes bearings 288 for spaced apart, vertical straightening roller shafts 289, there being three of these shafts as disclosed. Upon the upper end portion of each shaft 289 is fixed in any convenient manner, a vertical, side straightening roller 290, while the lower end portion 291 of each shaft 289 has fixed to it a spiral gear 292. 293 represents an upper, side straightening roller support having bearings 294 for the upper end of each of said shafts 289. The support 293 is bolted to the side, vertical roller bracket 287 as indicated at 295. The shaft 289 at the left in Fig. 19 has its lower end 291 supported in a bearing 296 integral with the side, vertical straightening roller bracket 287. The lower ends of the two other shafts 289 in Fig. 19 are supported by a lower, side straightening roller support 297 having bearings 298 for the lower ends of said two other shafts 289. The lower, side straightening roller support 297 is bolted to the side, vertical roller bracket 287 as indicated at 299.

300 is a second, side, vertical straightening roller bracket including bearings 301 for spaced apart, vertical straightening roller shafts 302, there being three of these shafts as disclosed. The side, vertical straightening roller bracket 300 is adapted to be bolted, as at 303, to the side, vertical straightening roller bracket 287 so that the end shafts 302 are directly opposite the end shafts 289, and the intermediate shafts 302 and 289 are in staggered relation. See Fig. 18. Upon the upper end portion of each shaft 302 is fixed in any convenient manner, a vertical, side straightening roller 304, the rollers 290 and 304 being adapted to lie in the same horizontal plane. 305 represents an upper, side straightening roller support having bearings 306 for the upper end of each shaft 302. The support 305 is bolted to the side, vertical roller bracket 300 as indicated at 307.

The opposite edges of the strip of metal are adapted to engage the vertical, side straightening rollers 290 and 304 as the metal is fed through the straightener, and, as disclosed more clearly in Fig. 21, each roller 290, 304 is grooved at 308 to receive said opposite edges of said strip metal.

The lower horizontal straightening roller housing 285 includes spaced apart, lower, horizontal, transverse shafts 309, 310, and 311 mounted in bearings 312 of said roller housing 285, each of said shafts having a lower, horizontal straightening roller, denoted 313, 314, and 315, respectively.

316 represents an upper, horizontal straightening roller housing, secured upon the lower, horizontal straightening roller housing 285 in any suitable manner, as at 317, and having spaced apart, upper, horizontal, transverse shafts 318 mounted in bearings 319 of said roller housing 316, each of said shafts 318 having an upper, horizontal, straightening roller 320, said upper rollers 320 being opposite rollers 313, 314, and 315, in staggered relation thereto. See Fig. 19.

The straightening rollers 313, 314, and 315 protrude upwardly beyond the lower roller housing 285, and the bearings 319 of the upper roll housing are bosses all extending downwardly to lie at opposite sides of and closely adjacent to the side edges of a strip of metal passed between the rollers of said upper and lower roller housings (see Fig. 20) to insure that the strip cannot move transversely from between said rollers. 321 are slots in the forward and rearward walls of the upper roll housing to allow passage of the strip. See Fig. 19.

A small sprocket 322 fixed upon the shaft 146 having the lower, large gear 140 has upon it a chain 323 also riding upon a larger sprocket 324 fixed upon a sleeve 325 rotatable upon a pin 326 fixed in the machine frame. A third sprocket 327 fixed upon the sleeve 325 has upon it a chain 328 also riding upon a fourth sprocket 329 fixed upon a shaft 330 extending longitudinally of the straightening roller bracket 283. See Fig. 3.

The shaft 330 is mounted in spaced brackets 331 adjacent the spiral gears 292, 332 representing screw bolts securing said brackets 331 to the side, vertical straightening roller brackets 287. 333 are spiral gears upon the shaft 330 and meshing with the spiral gears 292 upon shafts 289. See Figs. 1 and 21. 334 is a spiral gear fixed upon the shaft 330 and situated in the gear housing 286. 335 is a short shaft, at right-angles to the shaft 330, mounted in the inner wall of the gear housing 286 at 336 and mounted as at 337 in a cover plate 338 fixed to the front of the gear housing by screw bolts 339. A spiral gear 340 upon the short shaft 335 meshes with the spiral gear 334 upon the shaft 330. 341 is a gear fixed upon the short shaft 335 and located outside of the cover plate 338 adjacent said plate. 342 and 343 denote gears fixed upon the lower, horizontal, transverse, end shafts 309 and 311, respectively, and meshing with the gear 341 fixed upon said short shaft 335. See Figs. 1, 18, 19 and 20. Clearly, rotation of the lower, large gear 140 causes the sprocket chains to be actuated, and these rotate the shaft 330 to turn the vertical and horizontal straightening roller shafts together with the straightening rollers upon said vertical and horizontal shafts, the spiral gear arrangement in each instance, being, of course, that arrangement which drives the straightening rollers mentioned in direction to feed the strip of metal. The remainder of the straightening rollers are idlers.

The strip metal straightener, naturally, assists in guiding the strip of metal. Additional mechanism for guiding the strip is provided, however, and there is also provided in the machine mechanism for guiding severed or detached, unfinished blanks and for propelling said blanks from the sixth set of rolls in the machine to the assembling set thereof.

Of the additional strip guiding mechanism 344 is a guide bracket secured to the front end of the straightening roller bracket as indicated at 345. See Figs. 18, 19 and 22. 346 is a guide holder slidably mounted in ways 347 of arms 348 of the guide bracket 344 to be adjustable transversely of the strip metal straightener, as by an adjusting screw 349 fixed in said arms 348 against longitudinal movement and engageably passing through a threaded eye 350 of the guide holder 346. 351 is a lock nut upon the adjusting screw. The guide holder 346 has a flat, upper face 352 at the ends of which are upright limiting lugs 353. 354 are horizontal gages or guides adapted to lie in the horizontal plane of the line of feed of the strip of metal and having longitudinal grooves 355 in their adjacent side edges adapted to receive the opposite edges of said strip of metal. The forward end portions of said gages or guides 354 enter the horizontal roller housings through a slot 321 and are pivoted as by pins 356 upon the upper face of the lower roller housing 285. An intermediate part of each gage or guide 354 rests upon the flat face 352 of the guide holder 346, and the outer edge 358 of each gage or guide 354 engages an inner face of an upright lug 353. A screw 359 secures each gage or guide to the upper face of the guide holder. Portions 360 of each gage or guide extend forwardly beyond the guide holder 346 and the arms 348 of the guide bracket. Clearly, actuation of the adjusting screw 349 manipulates the guide holder 346 transversely of the strip metal straightener, and causes the gages or guides 354 to swing on their pivots 356 to be aligned with the strip metal and preferably to lie in contact with the full width of the inner faces of the lugs 353, as shown, whereby said lugs 353 can better insure the set positions of said gages of guides.

361 denotes, generally, a different form of guiding mechanism, between each of adjacent sets of rolls of the first six sets, there being five of these guiding mechanisms disclosed. See Figs. 1, 23, and 24. Of each of the present guiding mechanisms, 362 is a vertical guide holder bracket adapted to be secured to the base of the frame, as at 363 in Fig. 24, at a location beneath and between each of the adjacent sets of rolls of said first six sets. 364 is a guide holder pivoted at 365 to ears 366 upon the lower end of the bracket 362. The upper face of the guide holder 364 includes a central channel 367 extending longitudinally of the machine frame and including a flat, horizontal lower face. Adjacent the channel 367 said upper face of the guide holder 364 is cut away to provide flat, horizontal surfaces 368 at the outer edges of which are shoulders 369 having inner faces 370 which also extend longitudinally of the machine frame and are parallel with each other. The channel is in width slightly greater than the width of a strip of metal to be operated on in the machine and receives a lower gage 371 adapted to serve as one member of a guide device 372, the other members of which device are upper gages 373 upon the surfaces 368 and engaging the shoulders 369. The lower surfaces of the inner margins of the upper gages 373 are cut away as at 374, and the strip is adapted to move in a slot (the guide device 372) constituted by the lower gage 371 and the cut-out portion 374 of the upper gages 373. See Fig. 24. Of course, each guide device is in the horizontal plane of the line of feed of the strip of metal. 375 is an adjusting screw engageably passing through the guide holder 364 and contacting with the bracket 362, whereby the guide holder can be swung upon its pivots upon the ears 366 to move transversely of the frame and of the strip metal line of feed, and 376 is a screw bolt passing through the guide holder and threaded into the bracket 362 to lock said guide holder in any adjusted position to which set by the adjusting screw 375. 377 is a lock nut upon said adjusting screw 375. It is evident that by means of the adjusting screw 375 and the screw bolt 376 each guide device 372 can be set to align with the line of feed of the strip of metal. The lower gage 371 is of the width of the channel 367. It may be fixed against longitudinal movement therein in any suitable manner, as by a pin or pins 378 (see Fig. 24) in the base of the channel 367 and entering the lower gage. The upper gages 373 are, as shown, held to the surfaces 368 by small screw bolts 379. The forward edges of the upper and lower gages 373 and 371 are tapered as indicated at 380 to allow easy insertion of the strip of metal.

The mechanism for guiding severed or detached, unfinished blanks and for propelling said blanks from the sixth set of rolls to the assembling set is best shown in Figs. 1, 27, 28 and 29.

Of the guiding mechanism, a small, obliquely positioned frame, which is a casting as disclosed, consists of a back member 381 secured to the upright 2 as indicated at 382 and top and bottom members, denoted 383 and 384, respectively, extending outwardly at right-angles from said back member 381. The bottom member 384 supports a metal plate 385 the upper end of which terminates at 386 not far from the working station of the sixth set of rolls, and the lower end of which terminates at 387 not far from the working station of the assembling set of rolls. See Fig. 27. 388 represents spaced apart guide members upon the plate 385, said guide members being secured to said plate as indicated at 389 and said plate being secured to said bottom member 384 as indicated at 390. The guide members 388 are parallel and are spaced apart a distance about equal to the width of links formed in the machine (see Figs. 28 and 29). Their upper ends terminate at the location 391 about half-way between the upper end of the plate 385 and the working station of the sixth set of rolls, while their lower ends terminate at the location 392 about half-way between the lower end of the plate 385 and the working station of the assembling set of rolls (see Fig. 27). The upper end portions of the guide members 388 have inwardly extending, overhanging walls 393 for insuring that the blanks from the sixth set of rolls will enter the blank receiving guide composed of the plate 385 and the guide members 388.

Of the link propelling mechanism, 394 is a sprocket frame including spaced frame members 395 and 396 having spaced bearings 397 and 398 at the ends thereof. The frame member 395 is secured upon the small frame back 381 as at 399, and the spaced bearings 397 carry a shaft 400, while the spaced bearings 398 carry a shaft 401. Spaced sprockets 402 and 403 upon the shafts 400 and 401, respectively, are situated between adjacent bearings 397 and 398 (see Figs. 28 and 29), an enlargement 404 upon each shaft 400 and 401 insuring the spaced relation of said sprockets 402 and 403. A double sprocket chain upon the sprockets 402 and 403 includes spaced sprocket chains, denoted 405 and 406, respectively. Each sprocket chain 405 and 406 includes spaced links, denoted 407 and 408, respectively, 409 representing bushings between said links 407 and said links 408. Smaller, outside links 410 and blocks 411 between adjacent links 407, 407 of the sprocket chains 405 and 406, receive rivets 412 which complete each sprocket chain and connect said chains to each other, said rivets also passing through the links 407 and 408 and the bushings 409. The blocks 411 space the different sprocket chains apart, and each block 411 receives two rivets 412, thus serving, with the smaller, outside links 410, to connect adjacent links of the different sprocket chains. The teeth of a sprocket 402 and of a sprocket 403 travel between links 407, 408 of sprocket chain 405, and the teeth of the other sprockets 402 and 403 travel between the links 407, 408 of sprocket chain 406. The sprockets 403 are fixed to turn with the shaft 401 and are adapted to engage the bushings 409 to drive the double sprocket chain ahead, the sprockets 402 being idlers driven by the bushings 409 of said double sprocket chain. The spaced apart blocks 411 are adapted to propel to the assembling set of rolls each detached, unfinished blank that leaves the sixth set of rolls. The blocks have reduced portions 413 to nicely enter the spaces between the side bars of the unfinished link blanks, each reduced portion entering the opening between the side and end bars of a link positioned in the blank receiving guide. As disclosed, the blocks push against the inner faces of the small end bars or pintles of the severed, unfinished links to drive said unfinished links forwardly. The spaced apart guide members 388 are cut away as at 414 to clear the sprockets 402 and 403 and the sprocket chains 405 and 406.

415 is a bracket fixed upon the top member 383 of the small frame as at 416, and 417 is a shaft mounted in said bracket. Upon one end of the shaft 417 is fixed a gear 418 with which a gear 419 fixed upon the shaft 156 having the rotatable die 155 meshes. Upon the other end of the shaft 417 is fixed a gear 420 which meshes with a gear 421 fixed upon said shaft 401 in said sprocket frame 394 and having said sprockets 403. Plainly, by this arrangement rotation of the die shaft 155 drives the double sprocket chain ahead, in the direction indicated by the arrows in Fig. 27.

The operation of the machine thus far described will be readily understood. A strip of metal A is placed through the straightening rollers and between the rearward or first set of rotatable dies and power is applied to rotate all of the rotatable dies so that the strip is continuously fed forwardly, the power also driving, in the manner fully set forth, all of the movable parts of the machine. The straightening rollers all act upon the strip of metal, and the strip is guided and centered by said straightening rollers as well as by all of the gages, to lie properly between all of the sets of rotatable dies. A section of metal which is to form a link blank is first acted upon by the scoring knives 188, 189 to score the upper and lower surfaces of the stock along the longitudinal links indicated at 422. Thence the section so scored passes beyond the rearward rolls and the succeeding scoring knives of the first set move forwardly and vertically, uniformly and gradually, into the forwardly moving stock to repeat the longitudinal scoring operation just described. Eventually, the link blanks pass successively between each set of rolls, and the upper and lower dies of each other set cause the working elements to move toward and with the strip of metal in the same general manner as do the upper and lower dies of the rearward set of rolls.

The action of the scoring knives 190, 191 of the second set of rolls is to score the upper and lower surfaces of the stock along the transverse line of scores indicated at 423.

The action of the severing and crimping elements of the upper and lower dies of the third set of rolls is to sever the stock along the lines of score 423 and along the portions of the lines of score 422 adjacent said lines of score 423; to crimp or form the forward or free end of the central portion or long, narrow lip of the large end or sprocket bar of each link; to crimp or preliminarily form the central portion or narrow lip of the small end bar or pintle of said link; and to throw said central portion or short, narrow lip of the small end bar or pintle slightly upwardly and the free end of said long, narrow lip of the sprocket bar slightly downwardly. The severing edges 202, 203 and 208, 214 of the dies of the third set cooperate to sever the metal of a link blank along the line of score 422 adjacent the line of score 423 and the severing and crimping punch 194 simultaneously severs the metal along said line of score 423. The combined action of the crimping surface 210 and crimping edge 200, crimping surface 197 and curved surface 198 is to throw the severed free end of the central portion or long lip of the large end or sprocket bar slightly downwardly below the plane of the strip of metal, as indicated at 424, and to give to said free end a quarter-circle crimp, as indicated at 425. The combined action of the crimping surface 206 and crimping surface 195 and crimping edge 196 is to throw the severed narrow lip of the small end bar or pintle slightly upwardly above the plane of the strip of metal, as indicated at 426, and to give to said narrow lip a crimp or preliminary forming which is less than a quarter-circle. The peripheral faces of the dies of the third set of rolls themselves are in engagement with the upper and lower faces of the metal of the strip constituting the side bars of the link blanks while the severing, crimping and preliminary forming elements of said dies of the third set are operating.

The action of the upper and lower dies of the fourth set of rolls is to sever the body of the central portion or long, narrow lip of the link blank adjacent its severed and crimped or formed end; to throw the central portion or long lip upwardly to a position slightly above the plane of the strip of metal; to throw the central portion or narrow lip of the small end bar or pintle further upwardly; and to preliminarily form the short, wide lip of the sprocket bar and the short, wide lip of the small end bar or pintle. The combined action of the cutting edges 226 and 236 is to sever the metal of the stock along the portions of the lines of score 422 which define the body of the long, narrow lip of the large end or sprocket bar adjacent the formed or free end thereof, already severed and crimped by the third set of rolls. The combined action of the complemental crimping surfaces 216, 231, and 217, 232 is to throw the short, wide lip of the large end or sprocket bar and the short, wide lip of the small end bar or pintle slightly downwardly and to preliminarily shape said mentioned lips, as indicated at 427 and 428, respectively. The action of the forward crimping face 221 of the crimping punch 220 is to further shape the short, narrow lip of the small end bar or pintle and to throw said short, narrow lip further upwardly, as indicated at 429. The action of the rearward face 222 of the crimping punch 220 and the sharing and bending projection 223 is to displace the metal for the long, narrow lip of the large end or sprocket bar slightly upwardly above the plane of the strip of metal, as indicated at 430. The peripheral faces of the dies of the fourth set of rolls engage the upper and lower faces of the metal of the strip constituting the side bars of the link blanks while the elements of said dies of the fourth set are operating.

The action of the upper and lower dies of the fifth set of rolls is to impart a transverse score to the strip of metal along the line of severance of two links which are to adjoin each other; to bend, form, or shape the short, wide lip of the small end bar or pintle further downwardly and to final form; to throw the short, narrow lip of the small end bar or pintle still further upwardly, to approximately vertical position; and to throw the short, wide lip of the large end or sprocket bar further downwardly and the severed long, narrow lip thereof further upwardly, and to simultaneously bend, form, or shape said short, wide lip of the large end or sprocket bar to final form. The action of the scoring knife 237 is to score the metal along the transverse line of score 431 defining the line of severance between two links which are to adjoin each other. The combined action of the complemental quarter-circles 239, 250 and 240, 251, and of the bending projection 246 and bending surface 247 which cooperate with the quarter-circles 239, 250, and the bending surface 245 which cooperate with the quarter-circles 240, 251 is to throw the short, wide lip of the sprocket bar further downwardly as at 432, and the severed long, narrow lip thereof further upwardly, as at 433, and to simultaneously shape said short, wide lip to final, quarter-circle form; and to shape the short, wide lip of the small end bar or pintle to final, quarter-circle form as at 434 and to throw the short, narrow lip of said small end bar or pintle upwardly to about vertical position as at 435. Naturally, the upward throwing of the severed metal for the long, narrow lip of the large end or sprocket bar assists the operation of throwing downwardly the short, wide lip thereof, and vice versa. The short, curved bending face 247 is, in effect, an axis about which the large end bar or end hook is turned during the operation upon the sprocket bar in the fifth set of rolls. Likewise, downward throwing of the short, wide lip of the small end bar or pintle assists the operation of throwing upwardly the short, narrow lip thereof, and vice versa. The combined action of the quarter-circles 239 and 250 is to shape the short, wide lip of the sprocket bar to final form. The combined action of the quarter-circles 240 and 251 is to shape the wide lip of the pintle to final form. The bending surface 245 throws the short, narrow lip of the pintle to vertical position, against the radial face 255. The bending projection 246 and curved bending face 247 throw the long, narrow lip of the sprocket bar into a space 254 between the flanges 253. The flanges 253 cooperate with the peripheral surface of the die 130 in feeding the metal strip horizontally forwardly while the bending and forming operations are being accomplished by the fifth set of rolls, and the spaces 254 between the flanges 253 and the elements 248 allow ready passage of each long lip beyond the die 129. The fifth set of dies operate upon the small end bar or pintle of a link at the rear of each transverse score line 431 and operate upon an adjacent large end or sprocket bar in advance of said transverse score line. That is to say, the operation in the fifth set of rolls upon a small end bar or pintle of a link is accomplished as said small end bar or pintle reaches the working station of said fifth set of rolls. Thereafter, as the sprocket bar of said link approaches said fifth station it is operated upon. See Fig. 13.

The action of the upper and lower dies of the sixth set of rolls is to sever each link from the strip; to bend, form, or shape the short, narrow lip of the small end bar or pintle to final form, and to simultaneously operate upon said small end bar or pintle to position it at desired angle relatively to the link side bars; and to throw the short, wide lip of the large end or sprocket bar further downwardly and the long, narrow lip thereof further upwardly to place the sprocket bar almost vertical and in its final forming and assembling position. The combined action of the cutting edges 260 and 267 is to sever the stock along the transverse line of score 431. The combined action of the forming surfaces 259, 268 and the bending projection 261 and bending surface 262 is to throw the long, narrow lip of the large end or sprocket bar further downwardly and the long, narrow lip thereof further upwardly in the space 270 between the flanges 269, to place the sprocket bar in its final forming and assembling position as indicated at 436. The combined action of the convex forming surface 272, the quarter-circle surface 257, the arc-shaped crimping surface 274, and the forming tool 275 is to bend or shape the short, narrow lip of the small end bar or pintle to final form as indicated at 437, and to operate upon said small end bar or pintle to position it at desired angle, approximately at right-angles as shown, with respect to the link side bars, as denoted at 438. The convex forming surface 272 and the quarter-circle surface 257 directly engage the opposite faces of the short, wide lip of the small end bar or pintle to throw said short, wide lip downwardly and thus the short, narrow lip upwardly. The concave crimping surface 274 engages the rearward face of the short, narrow lip of said small end bar or pintle while the forming tool 275 engages the rearward face of the small end bar or pintle at the location where the narrow and wide lips connect, to round said short, narrow lip to final form and to cause said lip, in cooperation with the convex forming surface 272 and quarter-circle surface 257, to move forwardly and upwardly, thus placing the whole of the small end bar or pintle approximately at a right-angle to the said bars of the link. The concave crimping surface 274 rides against the rearward, lower surface of the partially formed narrow lip of the small end bar or pintle and causes said narrow lip to be swung forwardly and upwardly and to be simultaneously shaped to quarter-circle configuration. The flanges 269 cooperate with the peripheral surfaces of the die 132 in feeding the link blank horizontally forwardly while the severing, bending and forming operations are being accomplished by the sixth set of rolls, and spaces 270 allow ready passage of the long lips of the severed links into and out of the die 131. The sixth set of dies operate upon the small end bar or pintle of a link at the rear of each severed link, and operate upon the large end or sprocket bar of each link while it is being severed and immediately thereafter. That is to say, the operation in the sixth set of rolls upon a small end bar or pintle of a link is accomplished as said small end bar or pintle reaches the working station of said sixth set of rolls, before the link is severed from the strip of metal. Thereafter, the sprocket bar of said link approaches said sixth station and is operated upon as said link is severed, simultaneously with the operation upon the small end bar or pintle of a succeeding unsevered link. See Fig. 14.

The action of the upper and lower dies of the assembling set of rolls is to finally shape the end hook or long, narrow lip around the small end bar of the succeeding severed link blank. Previous to reaching the final set of rolls, the short, wide lip and the outer end of the narrow lip for the large end or sprocket bar of the link have been properly crimped to assist the rolling of the sprocket bar to circular form, as denoted at 439, and the part-circle surfaces of the upper and lower dies of the essembling set, including the transversely arranged mandrel 280 in one of said part-circle surfaces, defining the detaching slot 440 (later sized by the stretcher and sizer mechanism) in the finished chain, nicely cooperative to provide a cylindrical sprocket bar.

All of the forming, severing and assembling elements have forward motion with the strip of metal, as well as vertical motion. It is this forward motion of the elements with the strip that makes possible the transformation of the metal into connected chain links while being fed.

A rotatable die of the present machine may have any preferred number of duplicate working elements. As disclosed, several links are at all times on their way from one set of rolls to the next during the operation of the machine, and the first six sets of rolls serve, together with the straightening rolls, to feed the strip of metal forwardly, although the strip could be fed by said first six set of rolls alone, or in some other manner not shown. As the working faces or elements of the oppositely disposed dies of the first six sets of rolls are all located to position the whole length of strip metal in a horizontal plane, the fact that several link blanks are always traveling from one set of rolls to the next is no detriment to the feeding of the strip metal by the sets of rolls, especially when the gages between the adjacent sets of said first six sets are employed. However, a special device is required to guide the severed blanks from the sixth to the seventh, or assembling set of rolls, and the severed blanks must be propelled from the sixth set to the assembling set in a manner different from the manner of feed of the strip from the first to the sixth set of rolls. The blank receiving guide and the link propelling mechanism constitute this device, and the link severing punch feeds the severed blanks into the receiving guide to be engaged by the blocks of the propelling mechanism, which blocks propel the severed blanks to the assembling rolls. Before a severed link blank has left the sixth set of rolls, the forward end of the blank has been pushed into the blanks receiving guide between the guide members 388 thereof. See Fig. 27. After a section is severed, the convex forming surface 268 of the blank severing knife 265 pushes, as it rotates forwardly, against the rear face of the sprocket bar of the severed link blank to force said blank a sufficient distance into the blank receiving guide and upon the oblique plate 385 to allow a reduced portion 413 to enter the opening between the side and end bars of the blank while resting upon said oblique plate 385 as best shown in Fig. 27. Said reduced portion 413 pushes against the inner face of the small end bar or pintle to propel the severed blank down the oblique plate 385 to the set of assembling rolls. The overhanging walls 393 insure that the link will enter the blank receiving guide to rest upon the plate 385 between the guide members 388. The short, wide lip of the small end bar or pintle and the short, wide lip of the large end or sprocket bar of each link blank rest upon said plate 385 to elevate the side bars a slight distance above said plate 385 to better receive the reduced portion 413 of the block. The blocks 411 themselves insure the positions of the link blanks in the blank receiving guide as they are pushed along.

The forward end of the blank receiving guide is sufficiently close to the dies of the assembling set of rolls so that the short, wide lip and the long, narrow lip to provide the large end or sprocket bar will be positioned in the part-circle surfaces of the lower and upper dies, respectively. As shown, said short, wide lip first contacts with the lower die 157 and positions itself in a part-circle surface 279 in front of its mandrel 280. Later, the free end or crimped portion of the long, narrow lip contacts with the upper die 155 and positions itself in a part-circle surface 277, the part-circle surfaces cooperating to turn the long, narrow lip to circular form about the small end bar or pintle of a succeeding link. The lower end of the oblique plate 385 terminates short of the lower ends of the guide members 388. A block 411 advances a link, and the small end bar or pintle thereof first rides beyond the plate 385 and descends by gravity to rest upon the rearward or inner face of the short, wide lip of the sprocket bar of the next adjacent forward link, as indicated at 441 in Fig. 27, the lower ends of the guide members 388 guiding the link to the die 157. The block moves upwardly to clear the link and as the die 157 advances further, the spaced apart walls 282 engage the outer portions of the short, wide lip of the small end bar or pintle as at 442 and feed the whole of the link to the die 157, the short, wide lip of the sprocket bar engaging in front of the mandrel 280 as indicated at 443 in said Fig. 27. When a link shall have been positioned in the blank receiving guide to the location where the small end bar or pintle thereof rests upon the die 157, gravity alone will feed the link, but should gravity and the spaced walls 282 fail to bring the link down, the next adjacent succeeding link in the blank receiving guide and propelled by a block 411 would carry said link ahead. Note in Fig. 27 the close proximity of the various links in the blank receiving guide. In fact, were the slant of the receiving guide steep enough, the blocks 411 would function to hold the links in properly spaced relation and back from the assembling rolls rather than to hold them in spaced relation and feed them to said assembling rolls. When a link shall have been placed upon the die 157 with the wide lip of its sprocket bar in the part-circle surface 279 in front of the mandrel and the small end bar of a succeeding link shall have been placed upon the spaced walls 282, and the assembling rolls are made to advance, the crimpled free end of the long, narrow lip of said sprocket bar is carried to a part-circle surface 277 of the die 155 as indicated at 444, which cooperates with the part-circle surface 279 of the die 157 to turn the long lip to circular form about the small end bar or pintle, the free end of the long lip entering the rearward portion of said part-circle surface 279 between the spaced walls 282 to contact with or to lie adjacent to the back face of the spacing mandrel. The spaced walls 445 of the die 155 locate the long, narrow lips in the surfaces 277. As the assembling rolls advance still further, the mandrel 280 rides away from the large end or sprocket bar to leave the detaching slot which is later sized in the machine. See Fig. 27.

The construction and operation of the stretching and sizer mechanism will be best understood from Figs. 1, 4, 25, 26, 30, 31 and 31a, and is adapted to the purpose of sizing the hook end of each link made in the machine and of stretching each link up to a predetermined size.

The bracket 446 secured to the machine frame base as at 447 has mounted in it a shaft 448 extending transversely of the frame. A spiral gear 449 upon said shaft 448 is engaged by a worm 450 upon the end of the shaft 146 spaced from the large gear 140. 451 denotes a stretching sprocket and 452 denotes a large gear adjacent said stretching sprocket, both keyed to the shaft 448. 453 is a gear and sprocket bracket pivotally supported upon the shaft 448 and having an opening 454 in which the large gear 452 and the stretching sprocket 451 are located. 455 is a shaft idly mounted in said bracket 453 at a location 456 above the shaft 448. 457 is a gear fixed upon said shaft 455 and with which the large gear 452 meshes. 458 is a stretching and sizing sprocket fixed upon the shaft 455, the stretching sprocket 451 and the stretching and sizing sprocket 458 both preferably being in a vertical plane passing through all of the rotatable dies on the machine so that the line of feed of the strip of metal, severed links, and finished chain will be in a single plane extending longitudinally of the machine frame, as will be understood. The upper portion of the gear and sprocket bracket 453 has an eye 459 which receives a screw 460 upon an adjustable bracket 461 pivoted upon the frame base as at 462. Lock nuts 463 upon the screw are adapted to engage the opposite faces of the eye 459.

Clearly, the stretching sprocket 451 and the stretching and sizing sprocket 458 are driven ahead, in the direction of the arrows in Fig. 31, by power imparted from the lower shaft 146, the worm 450 being, of course, properly set to rotate the shaft 448 in the direction of the arrow in Fig. 31.

The manner in which the stretching and sizer mechanism functions will be most clear from Figs. 31 and 31a. Each tooth 464 of the stretching sprocket 451 successively engages between the side and end bars of the links to feed the completed chain along, while each tooth 465 of the stretching and sizing sprocket 458 also engages between the successive links. 466 is a table or platform fixed upon the bracket 446 and directly beneath the stretching and sizing sprocket 458 in close proximity to the location where the teeth 465 successively do their work, and 467 is a guard plate secured upon the gear and sprocket bracket as at 468 which has a curved portion 469 in close proximity to the stretching sprocket 451 at the location where its teeth 464 successively do their work. The connected chain links in Fig. 31 pass over the table or platform 466 and each tooth of the stretching and sizing sprocket 458 successively enters between the side bars and end bars of a link as the chain advances. Thence the chain passes under the curved portion 469 of the guard plate and each tooth of the stretching sprocket 451 likewise successively enters between the side and end bars of a link as the chain advances. The teeth of the stretching sprocket 451 pull the chain along by successively engaging the rear outer face of each large end bar as at 470 to thus exert tension upon the small end bar directly to the rear of said large end bar, while the teeth of the stretching and sizing sprocket 458 resist the pull of the stretching sprocket 451 by successively engaging the front inner face of each large end bar as indicated at 471. The sprocket teeth 464 and 465 are preferably in width not much less than the distance between the side bars of the links of the chain being made, and the rearward face of each tooth of the stretching and sizing sprocket 458 is constructed adjacent the margin of the tooth to constitute a cam surface 472 adapted to exert, in a manner which will be obvious, a retarding action upon the large end bar of each link in opposition to the pulling action exerted by a tooth or teeth of said stretching sprocket 451, thus successively stretching the series of links at any time between a tooth of the stretching sprocket 451 and a tooth of the stretching and sizing sprocket 458, the stretch in the instance of each series of links being a uniform stretch. It is advantageous when manufacturing links of the present nature, (strip metal slightly varying in thickness must necessarily be utilized), to make provision in the structure of the apparatus to insure that all of the links will be of size a trifle less than a predetermined size, and to employ a stretching mechanism to bring each link up to size. The sprockets 451 and 458 cooperate to provide such a mechanism.

The stretching and sizing sprocket 458 is also adapted, in cooperation with the stretching sprocket 451 and the table 466, to reduce the diameter of the large end bar to a predetermined diameter providing a detaching slot of desired width. The cam surface 472 upon each tooth 465 of said stretching and sizing sprocket merges in a part-circle surface 473 between adjacent teeth 465 adapted to roll over the long lip of the large end bar or end hook, as indicated at 474 in Fig. 31a, thus reducing the diameter of said large end bar or end hook as well as the width of the detaching slot 440, shown in said Fig. 31a as of the desired size. During this rolling operation upon the large end bar or end hook, the table or platform 466 supports the wide lip of said large end bar or end hook.

The adjustable bracket 461 is, clearly, for the purpose of adjusting the teeth of the stretching and sizing sprocket 458 relatively to the teeth of the stretching sprocket 451 so that a desired tension can be put upon the links of the chain at all times between the working teeth of the different sprockets, the gear 457 simply rolling over the gear 452 as adjustment is accomplished.

As each tooth of the stretching and sizing sprocket 458 advances beyond the position as disclosed in Fig. 31a, clearance is afforded for passage of the sized large end bar or end hook to the stretching sprocket 451. When the assembled and finished links have traveled beyond the working teeth of the stretching sprocket 451 and the guard 467, they freely leave said sprocket 451 and pass out of the machine. See Fig. 31.

It is to be noted that the only feed necessary on the machine is the working elements and dies themselves, although certain of the straightening rollers are disclosed as feeding the strip, and there is in the machine a special feed for the severed links. The elements of the first six sets of rotatable dies and certain of the straightening rollers cooperate to feed the strip of metal. The severing knives and the link blank propelling mechanism cooperate to feed the severed blanks from the sixth set of rolls to the assembling set thereof. The assembling rolls themselves feed the severed links past said rolls and convert them into chain, and the length of chain between the assembling set of rolls and the stretching and sizing mechanism can hang slack (see Fig. 31). The stretching sprocket 451 of the stretching and sizer mechanism carries the finished chain out of the machine.

Many alterations in the construction and many apparently widely differing embodiments and applications of the invention will suggest themselves to those skilled in the art of making sheet metal chain links and chain making machines without departing from the scope and spirit thereof. The disclosure and description herein are purely illustrative, and are not intended to be in any sense limiting.

What is claimed is:—

1. In a machine of the character described, a blank severing and feeding element, a blank receiving guide, an assembling element, said blank severing and feeding element being adapted to deposit a severed link blank into said blank receiving guide, and means associated with said blank receiving guide adapted to carry said severed link blank from said blank receiving guide to said assembling element, said means including a chain and a block upon said chain adapted to engage said severed link blank in said blank receiving guide.

2. In a machine of the character described, a blank severing and feeding element, a blank receiving guide, an assembling element, said blank severing and feeding element being adapted to deposit a severed link blank into said blank receiving guide, and means associated with said blank receiving guide adapted to carry said severed link blank from said blank receiving guide to said assembling element, said means including a chain, sprockets for said chain, and a block upon said chain adapted to engage said severed link blank.

3. In a machine of the character described, a link blank severing and feeding element, a blank receiving guide adjacent said severing and feeding element adapted to receive severed link blanks, an assembling element adjacent said blank receiving guide, and means for separately feeding each severed link blank from said severing and feeding element, through said blank receiving guide, and to said assembling element, said means including a chain and spaced blocks upon said chain, each block being adapted to control the advancement of a severed link blank along said blank receiving guide.

4. In a machine of the character described, a link blank severing and feeding element, a blank receiving guide adjacent said severing and feeding element adapted to receive severed link blanks, an assembling element adjacent said blank receiving guide, and means for separately feeding each severed link from said severing and feeding element, through said blank receiving guide, and to said assembling element, said means including a chain and spaced blocks upon said chain, each block being adapted to engage one severed link blank and carry it along said blank receiving guide.

5. In a machine of the character described, a blank receiving guide including a way for severed and partially formed chain links, and means for carrying said links along said way, said means including a chain, spaced blocks thereon, and means for advancing said chain, each block being adapted to engage a link in said way to control its feed along said blank receiving guide.

6. In a machine for making chain from a strip of metal, a plurality of sets of oppositely disposed working elements for transforming the strip into partially completed links, a set of oppositely disposed working elements for severing the partially completed links from the strip as formed, a blank receiving guide adjacent the last mentioned set of working elements, a set of oppositely disposed assembling elements adjacent said guide, said set of oppositely disposed severing elements being adapted to separately feed each severed, partially completed link into said blank receiving guide, and means whereby said severed, partially completed links can be separately fed from said blank receiving guide to said assembling elements, said means including a chain and blocks thereon, there being a separate block adapted to engage each severed, partially completed link to control its feed along said blank receiving guide.

7. In a machine for making chain from a strip of metal, a plurality of sets of oppositely disposed working elements for transforming the strip into partially completed links, a set of oppositely disposed working elements for severing the partially completed links from the strip as formed, a blank receiving guide adjacent the last mentioned set of working elements, said set of oppositely disposed severing elements being adapted to separately feed each severed, partially completed link into said blank receiving guide, a set of oppositely disposed assembling elements adjacent said guide, and means for separately feeding each partially completed link along said blank receiving guide to carry it to a position adjacent said assembling elements whence it can move by gravity to an assembling element.

8. In a machine for making chain from a strip of metal, a plurality of sets of oppositely disposed working elements for transforming the strip into partially completed links, a set of oppositely disposed working elements for severing the partially completed links from the strip as formed, a blank receiving guide adjacent the last mentioned set of working elements, said set of oppositely disposed severing elements being adapted to separately feed each severed, partially completed link into said blank receiving guide, a set of oppositely disposed assembling elements adjacent said guide, and means for separately feeding each partially completed link in said blank receiving guide, said guide including a base along which each link slides and guide members at the opposite side edges of said base, said means being adapted to feed each severed, partially completed link beyond said base whence it can move by gravity to an assembling element, and said guide members being adapted to direct said link to said assembling element.

9. In a machine of the character described, a guide for a severed, partially completed link blank, said guide including a base and guide members at the side edges thereof, a set of assembling elements adjacent said guide, and means for feeding a severed, partially completed link blank along said guide toward said assembling elements, the base of said guide terminating short of said guide members whereby said link blank can move by gravity to said assembling elements, said guide members being adapted to direct said link blank to one of said assembling elements.

10. In a machine of the character described, a guide adapted to receive severed, partially completed links, each link including side bars, a small end bar approximately at right-angles to said side bars and including a short, wide lip and a short, narrow lip, and a large end bar approximately at right-angles to said side bar and including a short, wide lip and a long, narrow lip, said guide including a base upon which said short, wide lips are adapted to slide and guide members at the sides of said base, means for separately carrying each severed, partially completed link along said base, and assembling elements adjacent said guide, there being assembling elements each including a part-circle surface to receive the wide lip of said large end bar and a mandrel in said part-circle surface and assembling elements each including a part-circle surface to receive the long lip of said large end bar, the base of said guide terminating short of the guide members thereof whereby the small end bar of each severed, partially completed link can be guided to a part-circle surface of an assembling element to position itself in front of a mandrel thereof and the large end bar can be guided to a succeeding part-circle surface in front of its mandrel, said assembling elements having said part-circle surfaces with mandrels being adapted to advance the severed, partially completed links positioned thereon and carry the long lips thereof to said assembling elements having part-circle surfaces to receive said long lips, whereby each long lip can be rolled to approximately circular form about the small end bar of a succeeding partially completed link deposited upon said assembling element with the mandrel.

11. In a machine of the character described, a frame including spaced walls, spaced apart oppositely disposed bearings between said walls, a shaft mounted in each bearing, a rotatable die upon each shaft, said rotatable dies being disposed opposite each other and being adapted to perform transforming operations upon a strip of metal, means adapted to allow said bearings to be adjusted from and toward each other, means whereby one of said bearings can have longitudinal adjustment, and means for clamping said bearings between said spaced walls, said clamping means consisting of a block in one of said walls and adjustably entering a slot in a bearing, a clamping screw in said mentioned wall adapted to press against said block, and a key in the other wall fitting a transverse slot in a different bearing.

12. In a machine of the character described, a frame having spaced walls, spaced apart bearings between said walls, each bearing having a shaft with rotatable die, means between said bearings and adjustably spacing them apart, means in one of said walls for adjustably locating the bearing adjacent said wall, and means in the other of said walls to take up any space which may exist between said other wall and the bearing adjacent said wall and thus lock said bearings in said frame.

13. In a machine of the character described, a frame having spaced walls, spaced apart bearings between said walls, each bearing having a shaft with rotatable die, means between said bearings and adjustably spacing them apart, means in one of said walls for adjustably locating the bearing adjacent said wall, and means in the other of said walls to take up any space which may exist between said other wall and the bearing adjacent said wall and thus lock said bearings in said frame, said last mentioned means comprising a wedge in a slot in said other wall and fixed against longitudinal movement, a wedge movable in said slot, and means for manipulating said movable wedge.

14. In a machine of the character described, a frame having spaced walls, bearings between said walls, each bearing having a shaft with rotatable die, means between said bearings and spacing them apart, and means in said spaced walls adapted to engage adjacent bearings to clamp the bearings in said frame, said last mentioned means including a wedge in a slot in one of said walls and fixed against longitudinal movement, a wedge movable in said slot, and means for manipulating said movable wedge to force said fixed wedge against a bearing adjacent said fixed wedge.

15. In a machine of the character described, a machine frame, a shaft having a fixed bearing in said frame, a rotatable die fixed upon said shaft and having a link assembling element, a block adjustable in said frame, a shaft mounted in said block, a rotatable die fixed upon the just mentioned shaft and having a link assembling element complemental to the first mentioned link assembling element, a second shaft with a fixed bearing in said frame, a gear upon said second shaft, a gear upon the first mentioned fixed shaft with which said gear upon said second shaft meshes, an idler gear, a shaft for said idler gear, links in which said idler gear shaft is mounted, said first mentioned fixed shaft and said shaft in said adjustable block pivotally supporting said links, and said idler gear meshing with said gear on said second shaft, a gear upon said shaft in said adjustable block and meshing with said idler gear, and means for rotating said second shaft to drive said rotatable dies ahead.

16. In a machine of the character described, a link sizing mechanism including a sprocket having teeth adapted to enter links of a chain to pull the same along, and a sprocket having teeth adapted to enter links of said chain to exert a retarding action upon each link entered.

17. In a machine of the character described, a link sizing mechanism including a sprocket having teeth adapted to enter successive links of a chain to pull the same along, and a sprocket having teeth adapted to enter successive links of said chain to exert a retarding action upon each link to resist the pull of said pulling sprocket.

18. In a machine of the character described, a link sizing mechanism including a sprocket having teeth adapted to enter successive links of a chain to pull said chain along, a sprocket having teeth adapted to enter successive links of said chain at the rear of said link pulling sprocket, and means for driving said sprockets in synchronism, said rear sprocket being adapted to exert a retarding action upon each link to resist the pull of said pulling sprocket, thus successively stretching the series of links at any time between said pulling sprocket and said rear sprocket, the stretch in the instance of each series of links being a uniform stretch.

19. In a machine of the character described, a driven, forward sprocket adapted to propel a chain, a driven, rearward sprocket having teeth upon which said chain is adapted to ride, and a cam face upon the rear of each tooth of said rearward sprocket, said cam faces being adapted to successively enter the links of said chain as the same is pulled along by said forward sprocket and to exert rearward thrusts against said links tending to stretch a series of links between said forward and rearward sprockets during each interval while a rearward thrust is being made, each tooth of said rearward sprocket being of part-circle conformation directly back of its cam face, whereby each link can freely pass from each tooth of the rearward sprocket after its cam face has acted and said rearward sprocket has advanced.

20. In a machine of the character described, a link sizing mechanism including a sprocket having teeth adapted to enter successive links of a chain to pull the same along, a sprocket having teeth adapted to enter successive links of said chain to exert a retarding action upon each link, and a surface over which said chain passes, said surface being adjacent the teeth of said last mentioned sprocket to insure that said teeth positively enter the links of said chain.

21. In a machine of the character described, a link sizing mechanism including a sprocket having teeth adapted to enter successive links of a chain to pull the same along, a curved guard adjacent said teeth, the chain passing between said guard and said pulling sprocket, and a sprocket having teeth adapted to enter successive links of said chain to exert a retarding action upon each link.

22. In a machine of the character described, a link sizing mechanism including a sprocket having teeth adapted to enter successive links of a chain to pull the same along, a curved guard adjacent said teeth, the chain passing between said guard and said pulling sprocket, a sprocket having teeth adapted to enter successive links of said chain to exert a retarding action upon each link, and a surface over which said chain passes, said surface being adjacent the teeth of said last mentioned sprocket to insure that said teeth positively enter the links of said chain.

23. In a machine of the character described, a link sizing mechanism including a sprocket having teeth adapted to enter successive links of a chain to pull the same along, a sprocket having teeth adapted to enter successive links of said chain to exert a retarding action upon each link, and means for adjusting said sprockets relatively to each other.

24. In a machine of the character described, a link sizing mechanism including a sprocket having teeth adapted to enter successive links of a chain to pull the same along, a sprocket having teeth adapted to enter successive links of said chain to exert a retarding action upon each link, means for driving said sprockets ahead, and means for rotatably adjusting one of said sprockets relatively to the other sprocket.

25. In a machine of the character described, a link sizing mechanism including a sprocket having teeth adapted to enter successive links of a chain to pull the same along, a sprocket having teeth adapted to enter successive links of said chain to exert a retarding action upon each link, means for driving said sprockets ahead in synchronism, and means for rotatably adjusting one of said sprockets on its axis relatively to the other sprocket.

26. In a machine of the character described, a link sizing mechanism including a sprocket having teeth adapted to enter successive links of a chain to pull the same along, a sprocket having teeth adapted to enter successive links of said chain to exert a retarding action upon each link, a driven shaft upon which said pulling sprocket is fixed, a gear upon said driven shaft, a gear and sprocket bracket pivotally supported upon said driven shaft, a shaft idly mounted in said bracket and upon which said retarding sprocket is fixed, a gear upon said last mentioned shaft and meshing with the gear upon said driven shaft, and a bracket to which said gear and sprocket bracket is adjustably secured.

27. In a machine of the character described, a link sizing mechanism including a sprocket having teeth adapted to enter successive links of a chain to pull the same along, a sprocket having teeth adapted to enter successive links of said chain to exert a retarding action upon each link, a driven shaft upon which said pulling sprocket is fixed, a gear upon said driven shaft, a gear and sprocket bracket pivotally supported upon said driven shaft, a shaft idly mounted in said bracket and upon which said retarding sprocket is fixed, a gear upon said last mentioned shaft and meshing with the gear upon said driven shaft, a bracket pivoted upon the machine frame, and means adjustably securing said gear and sprocket bracket to said pivoted bracket.

28. The combination as specified in claim 20, and means for adjusting said link retarding sprocket from and toward said surface.

29. In a machine of the character described, a link sizing mechanism including a sprocket having teeth adapted to enter successive links of a chain to pull the same along, a sprocket having teeth adapted to enter successive links of said chain to exert a retarding action upon each link, a surface over which said chain passes, said surface being adjacent the teeth of said last mentioned sprocket to insure that said teeth positively enter the links of said chain, a driven shaft upon which said pulling sprocket is fixed, a gear fixed upon said driven shaft, a gear and sprocket bracket pivotally supported upon said driven shaft, a shaft idly mounted in said gear and sprocket bracket and upon which said retarding sprocket is fixed, a gear fixed upon said idly mounted shaft and meshing with the gear upon said driven shaft, a bracket pivoted upon the machine frame, and means adjustably securing said gear and sprocket bracket to said pivoted bracket, whereby said gear and sprocket bracket can be adjusted upon its pivot to move said retarding sprocket closer to or further from said surface and to thus turn said retarding sprocket upon its pivot to adjust it relatively to said pulling sprocket.

30. In a machine of the character described, a link sizing mechanism including a stretching sprocket having teeth adapted to pull a chain along, a stretching and sizing sprocket having teeth adapted to enter successive links of said chain to exert a retarding action upon each link and including part-circle surfaces for reducing the size of an end bar of each link, and a surface adjacent the teeth of said stretching and sizing sprocket to cooperate with said part-circle surfaces.

31. In a machine of the character described, a link sizing mechanism including a stretching sprocket having teeth adapted to pull a chain along, a stretching and sizing sprocket having teeth adapted to enter successive links of said chain to exert a retarding action upon each link and including part-circle surfaces for reducing the size of an end bar of each link, each tooth of said stretching and sizing sprocket having a rearward cam face and said part-circle surfaces being between the teeth of said stretching and sizing sprocket, and a surface adjacent the teeth of said stretching and sizing sprocket to cooperate with said part-circle surfaces.

32. The combination as specified in claim 30, wherein each part-circle surface is adapted to roll over an end bar of each link while resting upon said surface to reduce the diameter and the size of a detaching slot in said end bar to a predetermined size.

33. The combination as specified in claim 31, and a curved guard adjacent said stretching sprocket, the whole adapted to feed said chain and to allow free passage of the same past said link sizing mechanism.

34. In a machine for making chain from a strip of metal, a plurality of sets of oppositely disposed rotatable dies for transforming the strip into partially completed links, shafts upon which said rotatable dies are fixed, mechanism for rotating all of said shafts to drive said rotatable dies forwardly, the mechanism including a gear upon each die shaft, a pair of driven shafts, and spaced apart worms upon each driven shaft, each worm upon a driven shaft engaging a gear to rotate one die of each set of said plurality of sets of dies, and each worm upon the other driven shaft engaging a gear to rotate the other die of each set of said plurality of sets of dies, a set of oppositely disposed rotatable assembling elements, shafts upon which said assembling elements are mounted, a worm upon one of said driven shafts for driving said assembling element shafts, and an operable driving connection between said assembling element shafts and said last mentioned worm.

35. In a machine for making chain from a strip of metal, a plurality of sets of oppositely disposed rotatable dies for transforming the strip into partially completed links, shafts upon which said rotatable dies are fixed, mechanism for rotating all of said shafts to drive said rotatable dies forwardly, the mechanism including a gear upon each die shaft, a pair of driven shafts, spaced apart worms upon each driven shaft, each worm upon a driven shaft engaging a gear to rotate one die of each set of said plurality of sets of dies, and each worm upon the other driven shaft engaging a gear to rotate the other die of each set of said plurality of sets of dies, a set of oppositely disposed rotatable assembling elements, shafts upon which said assembling elements are mounted, a worm upon one of said driven shafts for driving said assembling element shafts, an operable driving connection between said assembling element shafts and said last mentioned worm, a device for propelling severed and partially completed chain links from the last of said transforming dies to said assembling elements, and mechanism actuated from an assembling element shaft for operating said link propelling device.

36. The combination as specified in claim 35, wherein the device for propelling said severed and partially completed links comprises a sprocket chain with blocks, shafts having sprockets over which said chain travels, a gear fixed upon one of said sprocket chain shafts, a short shaft having a pair of gears fixed thereon, one of which last mentioned gears meshes with said gear upon said sprocket chain shaft, and a gear rotatable with an assembling element shaft and meshing with the other gear upon said short shaft.

37. In a machine for making chain from a strip of metal, a plurality of sets of oppositely disposed rotatable dies for transforming the strip into partially completed links, mechanism for rotating all of said shafts to drive said rotatable dies forwardly, the mechanism including a gear upon each die shaft, a pair of driven shafts, spaced apart worms upon each driven shaft, each worm upon a driven shaft engaging a gear to rotate one die of each set of said plurality of sets of dies, and each worm upon the other driven shaft engaging a gear to rotate the other die of each set of said plurality of sets of dies, a link sizing mechanism, and a worm upon one of said driven shafts for actuating said link sizing mechanism.

38. The combination as specified in claim 35, a link sizer mechanism, and a worm upon one of said driven shafts for actuating said link sizer mechanism.

39. The combination as specified in claim 37, wherein said link sizer mechanism includes a pulling sprocket, a shaft upon which said pulling sprocket is fixed, a pair of gears upon said pulling sprocket shaft, one of said pair of gears meshing with said worm for actuating said sizer mechanism, an idly mounted shaft having a gear fixed thereon which meshes with the other of said pair of gears, and a sizing sprocket fixed upon said idly mounted shaft.

40. In a machine for making chain from a strip of metal, a plurality of sets of oppositely disposed rotatable dies for transforming the strip into partially completed links, shafts upon which said rotatable dies are fixed, mechanism for rotating all of said shafts to drive said rotatable dies forwardly, the mechanism including a gear upon each die shaft, a pair of driven shafts, and spaced apart worms upon each driven shaft, each worm upon a driven shaft engaging a gear to rotate one die of each set of said plurality of sets of dies, and each worm upon the other driven shaft engaging a gear to rotate the other die of each set of said plurality of sets of dies, and a strip metal straightener actuated from one of said driven shafts.

41. The combination as specified in claim 35, a link sizer mechanism, a worm upon one of said driven shafts for actuating said link sizer mechanism, and a strip metal straightener actuated from one of said driven shafts.

42. In a machine for making chain from a strip of metal, a plurality of sets of oppositely disposed rotatable dies for transforming the strip into partially completed links, shafts upon which said rotatable dies are fixed, mechanism for rotating all of said shafts to drive said rotatable dies forwardly, the mechanism including a gear upon each die shaft, a pair of driven shafts, and spaced apart worms upon each driven shaft, each worm upon a driven shaft engaging a gear to rotate one die of each set of said plurality of sets of dies, and each worm upon the other driven shaft engaging a gear to rotate the other die of each set of said plurality of sets of dies, a strip metal straightener including a shaft arranged parallel with the machine frame and a gear upon said strip metal straightener shaft, and a sprocket and chain connection between said last mentioned gear and one of said driven shafts.

In testimony whereof I have affixed my signature to said specification as administratrix of the estate of GUSTAF BARKSTROM, deceased.

AGNES BARKSTROM,
*Administratrix of the Estate of Gustaf Barkstrom.*